United States Patent [19]

Nakamura et al.

[11] Patent Number: 5,353,182
[45] Date of Patent: Oct. 4, 1994

[54] MAGNETIC DISK UNIT HAVING MAGNETIC DISKS AND A MAGNETIC HEAD WITH A HEAD SLIDER WHICH IS IN CONTACT WITH SURFACES OF THE MAGNETIC DISK

[75] Inventors: Takao Nakamura; Nobuya Sekiyama, both of Yokohama; Masaki Ohura, Odawara; Yoshiki Kato, Tokyo; Noriaki Okamoto, Ibaraki; Masami Masuda, Yokohama, all of Japan

[73] Assignee: Hitachi, Ltd., Tokyo, Japan

[21] Appl. No.: 985,176

[22] Filed: Dec. 2, 1992

Related U.S. Application Data

[62] Division of Ser. No. 513,609, Apr. 24, 1990.

[30] Foreign Application Priority Data

Apr. 27, 1989 [JP] Japan ................... 1-105921
Jun. 1, 1989 [JP] Japan ................... 1-137555
Jun. 10, 1989 [JP] Japan ................... 1-147302

[51] Int. Cl.$^5$ ............ G11B 5/48; G11B 5/012; G11B 5/82; B05D 5/12
[52] U.S. Cl. ................. 360/104; 360/98.01; 360/135; 428/694 R; 428/900; 427/128; 427/129; 156/645
[58] Field of Search ............. 360/131, 133, 135, 103, 360/104, 98.01; 428/141, 694, 900; 427/128, 129; 156/645

[56] References Cited

U.S. PATENT DOCUMENTS

| | | | |
|---|---|---|---|
| 4,514,451 | 4/1985 | Suzuki et al. | 428/141 |
| 4,540,618 | 9/1985 | Suzuki et al. | 428/141 |
| 4,670,319 | 6/1987 | Katoh et al. | 428/141 |
| 4,680,217 | 7/1987 | Kanesaki et al. | 428/141 |
| 4,698,251 | 10/1987 | Fukuda et al. | 360/135 |
| 4,720,412 | 1/1988 | Katoh et al. | 428/141 |
| 4,762,742 | 8/1988 | Sonoda et al. | 428/141 |
| 4,825,680 | 5/1989 | Coe et al. | 360/135 |
| 4,900,397 | 2/1990 | Werner et al. | 360/135 |
| 4,911,967 | 3/1990 | Lazzari | 360/135 |
| 4,943,957 | 7/1990 | Sato et al. | 360/135 |
| 4,985,306 | 1/1991 | Morizane et al. | 360/135 |
| 4,996,622 | 2/1991 | Takatsuki et al. | 360/135 |
| 5,047,274 | 9/1991 | Tsuya et al. | 360/135 |

FOREIGN PATENT DOCUMENTS

| | | |
|---|---|---|
| 54-23294 | 2/1979 | Japan . |
| 62-80825 | 4/1987 | Japan . |
| 62-203748 | 9/1987 | Japan . |
| 62-219227 | 9/1987 | Japan . |
| 62-236664 | 10/1987 | Japan . |
| 62-248133 | 10/1987 | Japan . |
| 63-156650 | 6/1988 | Japan . |

*Primary Examiner*—A. J. Heinz
*Assistant Examiner*—Jefferson Evans
*Attorney, Agent, or Firm*—Fay, Sharpe, Beall, Fagan, Minnich & McKee

[57] ABSTRACT

A magnetic disk includes a non-magnetic substrate with a surface processed layer having fine irregularities formed at least on a main surface thereof, and at least a thin film magnetic film and a protective film formed in that order on the non-magnetic substrate in such a manner that the fine irregularities are duplicated thereof. The surface of the surface processed layer of the non-magnetic substrate has protrusions whose surfaces are made flat and a configuration which exhibits a three-dimensional bearing curve in which the bearing ratio at a section taken at a depth from the top of the surface which corresponds to the portion of the top portion deformed by the head load during the contact start-stops drive is between 0.1% and 10%. The protrusions formed on the surface processed layer have a height ranging from several nm to several tens of nm. The bearing ratio is a value obtained at a depth of 5 to 10 nm from the top of the protrusions.

9 Claims, 27 Drawing Sheets

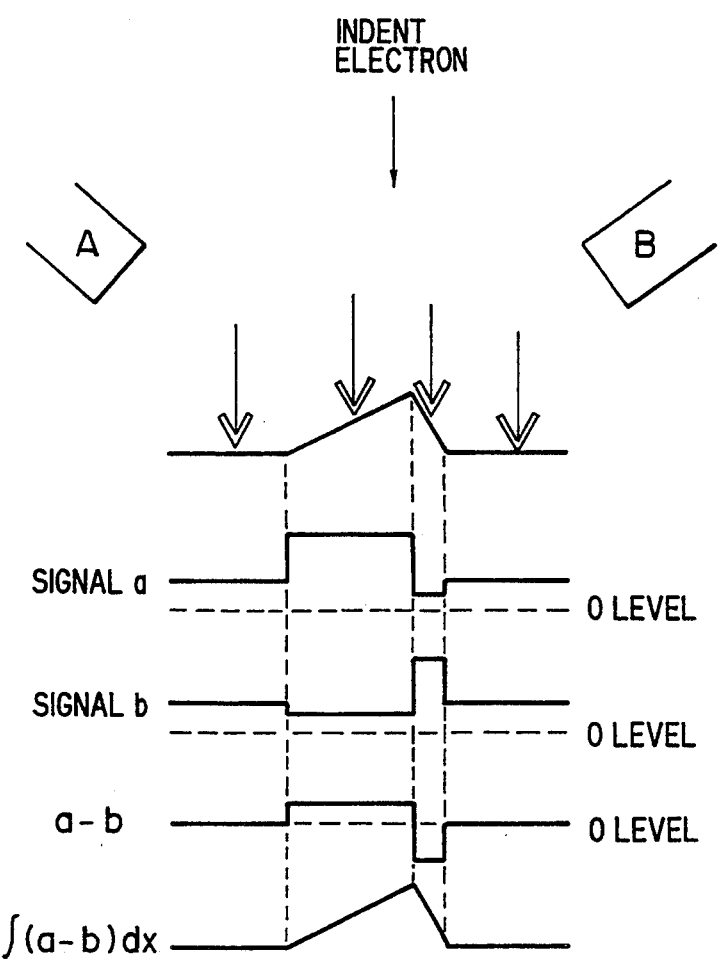

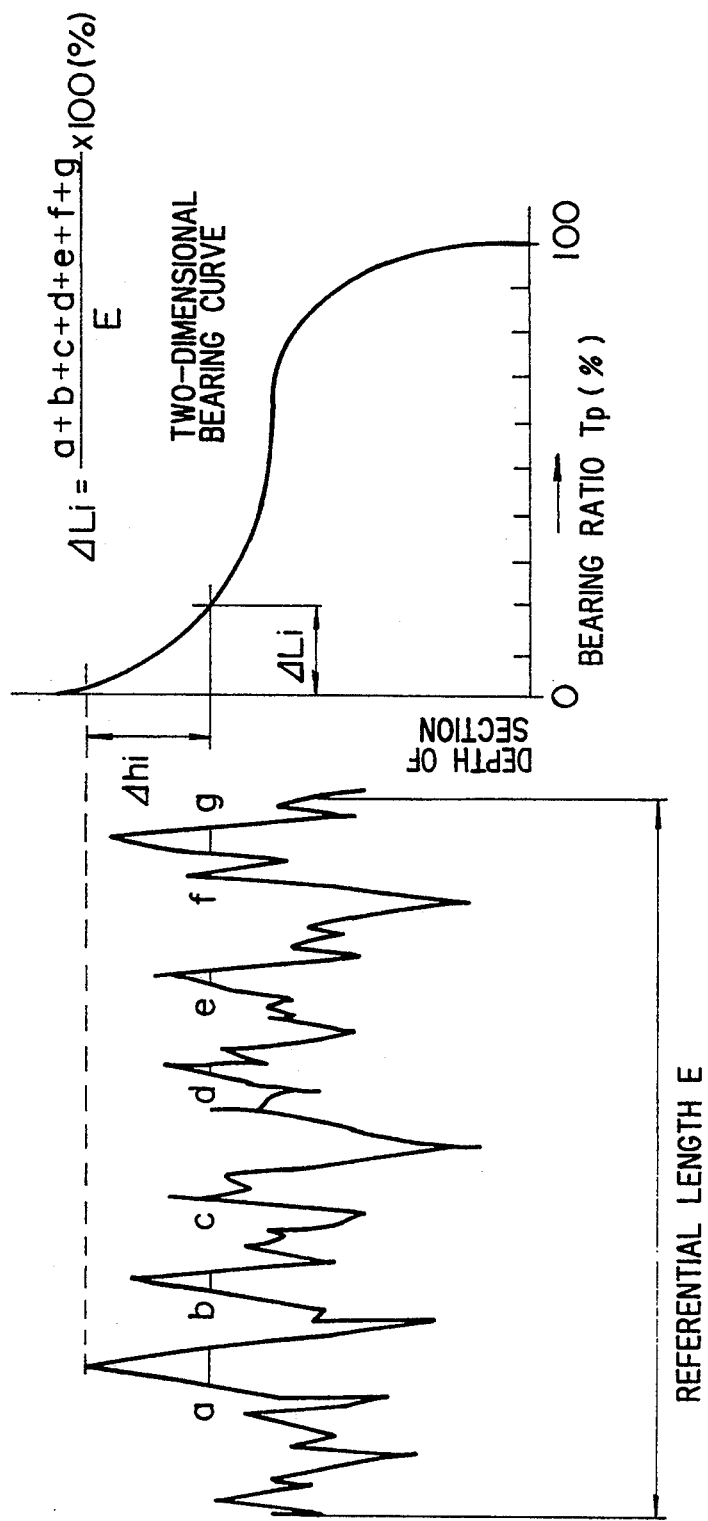

901, 902

904

UNIT: μm

DIRECTION OF DISK ROTATION

FIG. 51A
FIG. 51B
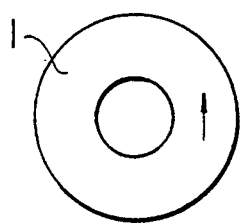
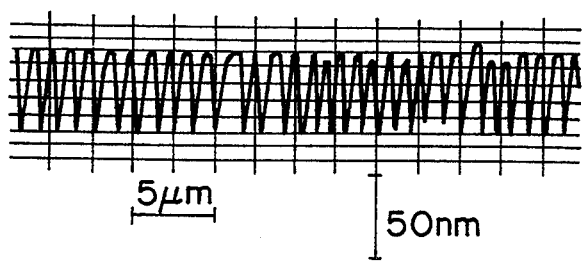
FIG. 52
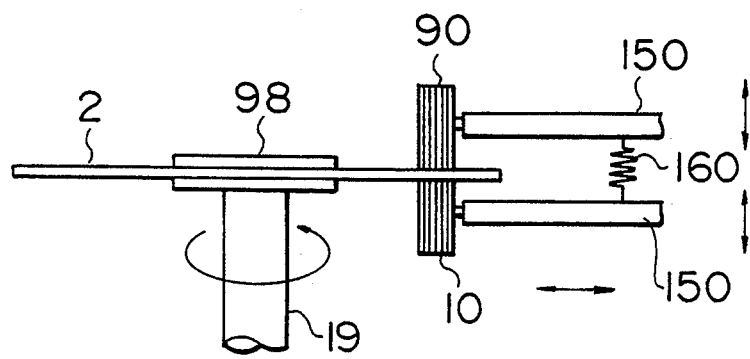
FIG. 53
FIG. 54
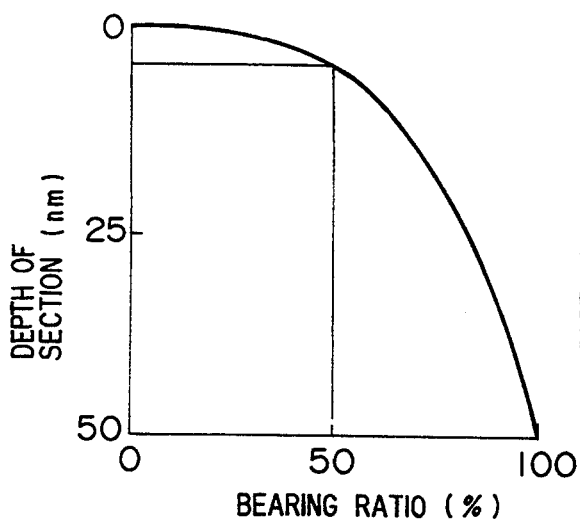
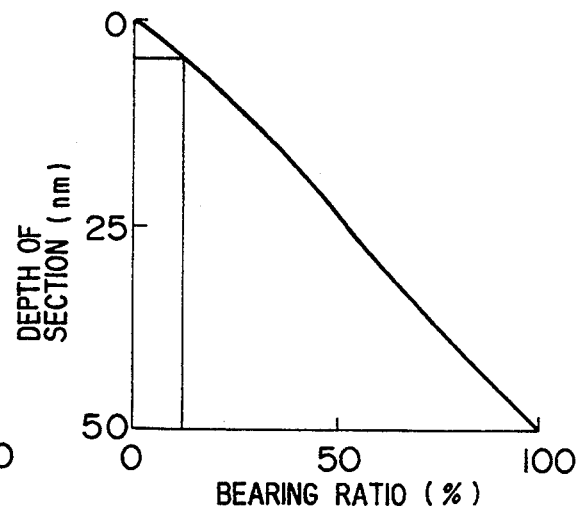

MAGNETIC DISK UNIT HAVING MAGNETIC DISKS AND A MAGNETIC HEAD WITH A HEAD SLIDER WHICH IS IN CONTACT WITH SURFACES OF THE MAGNETIC DISK

This is a divisional of copending application Ser. No. 07/513,609 filed on Apr. 24, 1990.

BACKGROUND OF THE INVENTION

Field of the Invention

The present invention relates to a magnetic disk, a method of and an apparatus for manufacturing the same, and a magnetic disk unit obtained by the same. More particularly, the present invention pertains to a magnetic disk of the type which employs a thin magnetic film as a recording medium, which enables the floating characteristics of a magnetic head thereto to be improved, and which exhibits improved sliding-resistant characteristics thereof, a method of and an apparatus for manufacturing the same, and a magnetic disk unit obtained by the same.

In high-density and large-capacity magnetic disks, the magnetic recording medium formed on a non-magnetic disk substrate is conventionally a coated film formed by coating magnetic powders held together by a resin on the recording medium. However, use of this coated film has been giving way in recent years to use of a thin magnetic metal layer directly formed on the disk substrate by deposition or sputtering. When the magnetic disk unit is driven, the magnetic disk (hereinafter referred to merely as "the disk") is housed in a magnetic disk unit in a stationary state with a magnetic head (hereinafter referred to merely as "a head") having a specific load being elastically in contact and pressed against the surface of the disk. Then, the magnetic disk is normally driven by the contact start stop (abbreviated to CSS) method as follows: as the disk starts rotating, the head starts sliding against the surface of the disk. Once the rotational speed of the disk reaches a value as high as 1000 rpm i.e. high speed rotation, the head floats in the air at a predetermined distance from the surface of the disk due to the dynamic pressure effects caused by the air flow generated between the sliding surface of the head and the disk. The magnetic head unit is arranged such that the head can be freely moved in the radial direction of the disk in this floating state so as to allow data to be stored on and retrieved from the surface of the disk at a desired position. When the operation of the disk drive is to be stopped, the rotational speed of the disk decreases, and thus the head starts sliding against the surface of the disk again. The head then stops in a state in which it is in contact with and presses against the disk. In this CSS driving method, each time the head and disk assembly is driven, the sliding surface of the head repeats a cyclic operation, consisting of stopping, sliding against the surface of the disk, floating in the air, sliding against the surface of the disk, and stopping. In order to facilitate floating of the head, the surface of the disk is generally provided with micro grooves which extend in the circumferential direction thereof. FIG. 10 shows a section of a disk 80. When the grooves of this type are to be formed, the surface of a disk substrate 30 is subjected to the surface polishing process called texture process prior to the formation of the magnetic film. Thereafter, a thin magnetic layer 32, a protective film 33 and a lubricating film (not shown) are formed on the irregular surface of the substrate, by means of which the grooves formed in the surface of the disk substrate are reproduced on the surface of the disk.

The texture process to which the disk surface is subjected is a polishing technique essential to the magnetic disk which is driven by the CSS driving method. For example, Japanese Patent Unexamined Publication No. 62-219227 discloses that, when the disk surface is polished to a maximum surface roughness of 0.02 to 0.1 $\mu$m, the thickness of a non-magnetic metal film (Cr film) can be reduced and productivity can thus be improved. It has also been disclosed that, when the CSS test was conducted 20,000 times on such a magnetic disk, no damage occurred on the surface of the disk while head crashing easily occurred on the surface of the disk having a surface roughness of 0.1 $\mu$m or above, and that, when the disk surface was not subjected to the texture process, it was damaged and head crashing occurred when CSS was conducted 5000 times.

FIG. 12 shows a conventional texture processing device which is disclosed in Japanese Patent Unexamined Publication No. 54-23294. In this device, the two surfaces of the disk substrate 30 are simultaneously processed by pressing polishing tapes 4, which are moved in a vertical direction by the rotation of reels 6, in the direction indicated by the arrow toward the two surfaces of the rotating disk substrate 30 by means of contact rollers 8 while moving back and forth in the radial direction of the disk substrate. FIGS. 7 and 8 are front and side elevational views showing the positional relation between the substrate 30 and the polishing tapes 4 which are moving along the substrate 30. In this texture process, a micro groove 37 such as that shown in FIG. 11, can be formed by the polishing tape. However, formation of the groove causes an unstable rising portion 36 to be formed at the shoulder of the groove. The rising portion 36 remains on the surface of the disk as a fine protrusion.

Hence, it has been proposed to conduct on the surface of the disk substrate a first polishing process which is a normal polishing process and then a second polishing process which employes abrasive grains smaller than those employed in the first polishing process to remove only the protrusions generated on the surface of the substrate by the first polishing process without removing the micro grooves formed in the surface of the substrate. Such a technique is disclosed in Japanese Patent Unexamined Publication No. 62-248133.

The maximum surface roughness of the disk substrate on which micro grooves are formed by the texture process and protrusions formed on the substrate in order to achieve improvement in the head floating have been specified. However, the optimal conditions of the surface which is subjected to the texture process in terms of the CSS characteristics and head adhesion characteristics are unknown, and the problems involving head crashing or the like have not yet been solved.

As high-density and large-capacity magnetic disks have been developed in recent years, the distance which the head floats above the surface of the disk in the CSS drive is becoming shorter and shorter. For example, it is required under severe condition that the gap between the surface of the disk and the sliding surface of the head (which is the distance by which the head floats above the surface of the disk), which is floating above the disk surface due to the rotation of the disk, be 0.2 $\mu$m or less. Hence, in order to realize this severe condition by means of the texture process, the height of the protrusions rising at the shoulders of the grooves must be suppressed at less than the distance by which the head floats up, so that it must be avoided for the head to collide against the protrusions. Thus, very strict surface characteristics of the disk is required. If only contact of the protrusions against the head sliding surface must be avoided, the head can be provided with a sufficient floating distance by changing the configuration of the head sliding surface, the leads applied to the head, the rotational speed of the disk, and so on. However, since the distance by which the head floats up must be reduced due to the increase in the recording density of the disk unit (it is ideal that the head is located as close to the magnetic film as possible), as stated above, and since the degree at which the protrusions deform and the degree at which the protrusions wear must be reduced, the height of the protrusions must be made uniform, and the area of the protrusions with which the head sliding surface makes contact must thereby be increased. Furthermore, deep pits must be provided in order to eliminate the debris of the surface of the disk.

Accordingly, it has conventionally been proposed to make the height of the protrusions formed as a consequence of formation of grooves uniform by dividing the polishing process subjected to the surface of the disk substrate into first and second processes and by polishing the protrusions in the second process. However, the optimal surface character of the disk substrate which is subjected to the texture process to the CSS characteristics and the head stickiness when the amount at which the head floats up is small, are unknown, and the problems involving the head crashing or the like have not yet been solved. More specifically, when the surface of the disk substrate is sufficiently polished to make the height of the protrusions uniform, the area of the surface of the disk against which the head slides (strictly speaking, the polished surface of the protrusions with which the head sliding surface makes contact) increases, thereby deteriorating the floating characteristics of the head. Furthermore, the lubricant coated on the surface of the disk (generally, a lubricant film is coated on the disk) or water contents contained in the air may attach to and accumulate on the head sliding surface due to the surface tension, and makes the head sliding surface adsorbed to the surface of the disk, causing cessation of rotation of the disk or damage to the head.

Japanese Patent Unexamined Publication No. 62-236664 discloses another method of forming fine irregularities on the recording surface of the magnetic disk. In the conventional methods disclosed by Japanese Patent Unexamined Publications Nos. 54-23294 and 62-236664 the fine irregularities are formed on the disk substrate 30 in the circumferential direction by moving the resilient contact rollers 8 back and forth in the radial direction of the disk substrate 30 while pressing them against the rotating disk 1 through the polishing tapes 4 and, concurrently with this, by winding the polishing tapes 4, as shown in FIG. 12. Furthermore, the height of the irregularities is made uniform by conducting a second process on the surface which has been subjected to the above-described process as the first process using the polishing tapes on which abrasive grains having an average grain diameter smaller than that of the polishing tapes employed in the first process are fixed.

The above-described conventional techniques pay no sufficient attention to the accuracy with which the micro grooves are formed on the recording surface and have a disadvantage in that the pitch or height of the fine irregularities on the recording surface differs depending on the site of the recording surface. Furthermore, these techniques suffer from a problem in that the irregularities cannot be formed on the surface of the disk at a height or pitch required to satisfy the head flyability to the disk or the durability of the disk surface due to use of a non-uniform abrasive grains of the polishing tapes. The present inventors made experiments in which irregularities were formed on a Ni-P plated aluminum disk 17 shown in FIG. 9 in the manner shown in FIG. 12 using a polyester film polishing tape 4 to which aluminum oxide grains having a grain diameter of 3 $\mu$m were fixed. The aluminum disk 17 had a surface roughness Ra of 2 to 3 nm, an outer diameter of 130 mm, an inner diameter of 40 mm, and a thickness of 2 mm. The experiments were conducted under a pressurizing force of 10N, at a disk rotational speed of 400 rpm, at an elastic contact roller feed speed of 100 mm/min, and at a polishing tape feed speed of 100 mm/min. FIG. 43 shows the cross-section of the thus-obtained disk. As shown in FIG. 43, the height of the protrusions and the depth of the grooves were non-uniform. In the graph shown in FIG. 43, the axis of abscissa represents the radial direction of the magnetic disk, and the axis of ordinate represents the vertical direction of the irregularities. When a magnetic disk unit incorporating such a magnetic disk was driven, the magnetic head could not float stably and was damaged due to so-called head crash in which the magnetic head makes contact with the protrusions on the surface of the magnetic disk. Furthermore, when the magnetic head was caused to slide 1000 times against the disk, the lubricant film or the protective film formed on the magnetic disk was broken. Furthermore, the tangential force of the magnetic head increased, as shown by the curve 122 of FIG. 40, in proportion to the times with which the magnetic head was caused to slide, and reached about 0.1N and the cessation of rotation of the magnetic disk thereby occurred when the magnetic head caused to slide 10,000 times. Hence, the surface of the disk was conventionally made level by conducting the second process on the surface of the disk, i.e., by polishing it again with the polishing tapes 4 of the smaller abrasive grains. However, even if the protrusions of the very non-uniform irregularities shown in FIG. 43 are polished to some degree by the second process, the aforementioned problems remain unsolved.

In addition to the above-described Japanese Patent Unexamined Publication Nos. 54-23294 and 62-248133, the method of forming a texture by providing fine irregularities on the substrate of the magnetic disk in order to improve durability of the disk surface and electrical characteristics is also disclosed in Japanese Patent Unexamined Publication No. 62-203748. In these texture forming methods, the texture is formed in the circumferential direction of the disk by using the polishing tape or free abrasive grains. In a case in which the polishing tapes are used, the texture is formed by the conventional disk manufacturing method shown in FIG. 12 by moving the contact rollers 8 back and forth in the radial direction of the disk 2 while pressing them against the rotating disk 2 through the polishing tapes 4 and, concurrently with this, by winding the polishing tapes 4. FIG. 55B shows the cross-section of the surface of the thus-obtained disk, which was measured along the direction indicated by the arrow in FIG. 55A.

However, the aforementioned conventional techniques give no attention to the accuracy of the shape, and have a problem in that the cross-sectional form of the surface of the disk differs depending on the position thereon. Furthermore, the above-described conventional techniques employ the polishing process and thus surface from problems in that debris of the surface is generated, in that scratches are generated and in that the processing residue remains.

Furthermore, since the aforementioned conventional techniques employ abrasive grains in the form of a polishing tape or the like, the height or pitch of the irregularities of the texture cannot be freely set, and it is therefore difficult to form irregularities that can satisfy the head floating characteristics, the contact start-stops characteristics and the electrical characteristics.

SUMMARY OF THE INVENTION

An object of the present invention is to eliminate the aforementioned conventional problems.

A primary object of the present invention is to provide a magnetic disk which exhibits excellent contact start-stops characteristics and does not easily generate head crashing even when the amount at which the head floats is made smaller in order to achieve improvement in the flyability between the magnetic disk and head and the durability of disk surface.

A second object of the present invention is to provide a method of manufacturing such an improved magnetic disk.

A third object of the present invention is to provide an apparatus for manufacturing the above-described magnetic disk.

A fourth object of the present invention is to provide a magnetic disk unit in which such a magnetic disk and a magnetic head driving device are provided as one unit.

In order to achieve the aforementioned objects, the present invention provides the following magnetic disk, the method of and apparatus for manufacturing the same, and the magnetic disk and head assembly.

The magnetic disk provided to achieve the first object of the present invention includes a non-magnetic substrate with a surface processed layer having fine irregularities formed at least on a main surface thereof, and at least a thin film magnetic layer and a protecting layer formed in that order on the non-magnetic substrate in such a manner that the fine irregularities are duplicated thereon. The surface processed layer of the non-magnetic substrate has protrusions whose surface character is essentially made level, and has a surface configuration which exhibits a three-dimensional bearing curve in which a bearing ratio at a section taken at a depth from the top of the surface which corresponds to the portion deformed by a head load during the CSS operation is between 0.1 and 10%.

Preferably, the magnetic disk includes a non-magnetic substrate with a surface processed layer having fine irregularities formed at least on a main surface thereof, and at least a thin film magnetic layer and a protecting layer formed in that order on the non-magnetic substrate in such a manner that the fine irregularities are duplicated thereon. The surface processed layer of the non-magnetic substrate has surface characteristics of protrusions whose height ranges from several nm to several tens of nm and whose surface is essentially made level, and a surface configuration which exhibits a three-dimensional bearing curve in which bearing ratio at a section taken at a depth of 5 to 10 nm from the top of the surface of the protrusions is between 0.1 and 10%.

More preferably, the non-magnetic surface processed layer has surface characteristics which exhibit a three-dimensional bearing curve in which a portion of the curve which represents a surface layer thereof is flat.

More preferably, the non-magnetic substrate surface processed layer has a surface characteristics in which micro grooves having a depth of at least 100 nm is present within a length thereof corresponding to the width of a head slider sliding surface and in which the symmetry of a sectional curve thereof Rsk is equal to or smaller than $-0.7$.

In order to provide an irregular surface in which micro grooves having a uniform height are formed at a uniform pitch over the entire surface of the disk, micro grooves are regularly formed with a high degree of accuracy on a recording surface of the magnetic disk substrate employing a cylindrical, drum-like, spherical or conical plastic working tool on the surface of which micro projections are formed.

In order to provide a magnetic disk whose sectional form is uniform, which eliminates residue, and which is highly accurate and reliable, fine irregularities are formed on a magnetic medium film formed on a non-magnetic intermediate film formed on the surface of a substrate.

A magnetic disk manufacturing method which is provided to achieve the second object of the present invention includes the steps of forming an irregular processed layer on a specular finished surface of a non-magnetic substrate by conducting first and second polishing processes on the specular finished surface of the non-magnetic substrate, forming a thin film magnetic layer on the irregular processed layer formed by the polishing processes, and forming a protective film on the thin film magnetic layer. The first polishing process is characterized by the formation of micro projections having a predetermined depth on the substrate at least within a length thereof corresponding to the width of a sliding surface of a magnetic head. The second polishing process is characterized in that, when protrusions formed at shoulders of the micro grooves as a consequence of formation of the micro grooves are to be polished to remove a predetermined amount of top portion thereof and thereby made flat, polishing of the top portion is suspended when it is detected in a three-dimensional bearing curve representing the surface configuration of the irregular processed layer that a bearing ratio at a section taken at a depth corresponding the portion deformed by the head load during the CSS drive is between 0.1% and 10%.

More specifically, a magnetic disk manufacturing method which is provided to achieve the second object of the present invention includes the steps of forming an irregular processed layer on a surface of a non-magnetic substrate by conducting first and second polishing processes on the specular finished surface of the non-magnetic substrate, forming a thin film magnetic layer on the irregular processed layer formed by the polishing processes, and forming a protective film on the thin film magnetic layer. The first polishing process is characterized by the formation of micro projections having a predetermined deep groove at least within a length corresponding to the width of a sliding surface of a magnetic head. The second polishing process is characterized in that, when protrusions formed at shoulders of the micro grooves as a consequence of formation of the micro grooves are to be polished to remove a predetermined amount of top portion thereof and made flat, polishing of the top portion is suspended when it is detected in a three-dimensional bearing curve representing the surface configuration of the irregular processed layer that a bearing ratio at a section taken at a depth of 5 to 10 nm from the surface top of the protrusions is between 0.1% and 10%.

More preferably, the first polishing process includes the steps of processing the non-magnetic substrate and washing the processed non-magnetic substrate. The non-magnetic substrate is processed by pressing first polishing tapes against the two surfaces of the non-magnetic substrate under a predetermined first pressure while feeding them in the circumferential direction of the non-magnetic substrate and vibrating and moving them in the radial direction of the non-magnetic substrate and, at the same time, by rotating the non-magnetic substrate at a rotational speed which ensures a predetermined first relative speed with respect to that of the first polishing tapes while a processing solution is being supplied to the surface to be polished. The second polishing process includes the steps of processing the non-magnetic substrate and washing the processed non-magnetic substrate. The non-magnetic substrate is processed by pressing second polishing tapes of abrasive grains having a grain size smaller than that of the first polishing tapes against the two surfaces of the non-magnetic substrate under a predetermined second pressure which is smaller than the first pressure while feeding them in the circumferential direction of the non-magnetic substrate and vibrating and moving them in the radial direction of the non-magnetic substrate and, at the same time, by rotating the non-magnetic substrate at a rotational speed which ensures a predetermined second relative speed with respect to that of the second polishing tapes which is larger than the first relative speed while a processing solution is being supplied to the surface to be polished.

The top portion of the micro grooves formed on the recording surface may also be polished by the electro polishing, the lapping polishing employing a plate on which a polisher is adhered and abrasive grains liquid, or the lapping polishing in which a polishing tape is pressed through an elastic roller or pneumatically.

The micro grooves may be copied on the recording surface of a plastic magnetic disk substrate or a magnetic disk substrate with a plastic coated thereon or a substrate formed of a material that can be processed regularly and with a high degree of accuracy using the magnetic disk substrates manufactured by the above-described method as an original substrate.

The magnetic disk may also be manufactured by forming fine irregularities on the surface of the substrate thereof by means of the plastic working and then by coating a non-magnetic film and a magnetic medium film on the substrate.

The magnetic disk may also be manufactured by forming fine irregularities on a non-magnetic film or a magnetic medium film and a protective film coated on the surface of the substrate of the magnetic disk by means of the plastic working.

The magnetic disk manufacturing apparatus which is provided to achieve the third object of the present invention includes a substrate supporting tool for rotatably supporting a disk substrate, a first processing head having a contact roller unit for simultaneously pressing polishing tapes used in a first polishing process against the two surfaces of the substrate, a tape winding roller for winding the polishing tapes, and a reciprocatively moving means for vibrating the contact roller unit in the radial direction of the substrate, a second processing head disposed on the opposite side of the substrate supporting tool for conducting a second polishing process, the second processing head having the same configuration as that of the first processing head, a substrate rotating means for rotating the substrate such that the speed thereof relative to the polishing tapes is a predetermined value, a substrate washing means disposed between the two processing heads for washing the substrate, and a control unit for controlling at least an operation timing of the two processing heads and the substrate rotation means.

The magnetic disk manufacturing apparatus according to the present invention may also include a means for supporting and rotating a thin film magnetic disk, a processing tool comprising a rotary member whose rotary axis lies in the radial direction of the thin film magnetic disk, a surface of the rotary member having fine irregularities, the processing tool being capable of plastically working a surface of the thin film magnetic disk, a supporting member on the forward end of which the processing tool is rotatably mounted, and a control means for displacing the supporting member and thereby controlling a pressurizing force applied to the thin film magnetic disk by the processing tool.

More specifically, in the magnetic disk manufacturing apparatus, the fine irregularities formed on the surface of the processing tool are transferred onto the surface of the substrate (for a magnetic disk) made of, for example, an aluminum alloy, anodic aluminum oxide or an Ni-P plated aluminum alloy, or on a non-magnetic film or a magnetic medium film formed on the substrate by the sputtering or the plating to form a texture by pressing the processing tool against the surface of the rotating disk under a fine and uniform pressure and, at the same time, by moving it back and forth in the radial direction of the disk. The processing tool comprises a rotary member whose central axis lies in the radial direction of the disk. The processing tool has a cylindrical form or the surface of the processing tool with which the disk makes contact is spherical. The surface of the processing tool may be coated by diamond or TiC. In order to form the configuration of the surface of the disk with a high degree of accuracy, the processing tool is pressed against the surface of the disk under a fine and constant pressure.

A processing tool which has a highly accurate configuration and exhibits excellent wear-resistant characteristics may be provided by forming fine irregularities on the surface of a sintered hard alloy by means of the cutting or the dry etching and then by coating diamond or TiC on the surface of the sintered hard alloy.

The magnetic disk unit which is provided to achieve the fourth object of the present invention includes a plurality of magnetic disks mounted coaxially and separated with a predetermined distance, and a head driving unit for recording data on and retrieving data from the magnetic disks by a CSS driving method in which a head slider on which a magnetic head is mounted is elastically in contact with and slides against at least one surface of each of the disks under a predetermined pressure in a state where the disk is stationary and in the initial state of rotation of the disk, in which the head slider floats up due to the rotation of the disk at a high speed, and in which the head slider is moved back and forth in the radial direction of the disk. The surface character of the magnetic disk against which the head slider slides has a configuration which is the duplicate of a surface configuration of an irregularly processed layer on a surface of a magnetic disk substrate which is a non-magnetic substrate. The surface character of the disk substrate has protrusions whose surface is made flattened, and exhibits a three dimensional bearing curve in which a bearing ratio at a section taken at a depth from the top portion of the surface which corresponds to the portion of the surface deformed by the head load during the CSS drive is between 0.1 and 10%.

Preferably, the surface character of the disk substrate may have protrusions whose height is between several nm and several tens of nm and whose surface is made flat, and exhibits a three-dimensional bearing curve in which a bearing ratio at a section taken at a depth of 5 nm to 10 nm from the top of the protrusions is between 0.1% and 10%.

More preferably, the surface character of the disk substrate may exhibit a three-dimensional bearing curve in which the portion thereof representing a surface layer is flat. More preferably, the surface character of the disk substrate may have at least one micro groove having a depth of about 100 nm within a length thereof corresponding to the width of a head slider sliding surface, and exhibit a sectional curve whose symmetry is indicated as Rsk ≦ −0.7. More preferably, if the pressure provided by the head load W received on the area S of the disk surface with which the head slider makes contact is W/S, and if the yield strength of the fine protrusions formed on the surface of the disk substrate is $\sigma$, the disk sliding surface may have an initial state in which $\sigma \geq W/S$ holds.

BRIEF DESCRIPTION OF THE DRAWINGS

FIG. 24 illustrates the principle of the method of three-dimensionally measuring a texture processed surface by means of the SEM;

FIGS. 30A to 31B illustrate the configuration of the texture processed surface according to the present invention using the three-dimensional bearing curves;

FIGS. 49A to 51B respective show the direction in which the disk is processed by the processing tools shown in FIGS. 45A to 46B and the sectional form of such a disk;

FIG. 52 is an upper plan view of the essential parts of another embodiment of a disk manufacturing apparatus according to the present invention;

FIG. 53 shows an Abott-Firestone bearing ratio curve of a disk obtained in Example 3 of the present invention;

FIG. 54 shows an Abott-Firestone bearing ratio curve of a disk obtained by a conventional disk manufacturing method;

DETAILED DESCRIPTION OF THE PREFERRED EMBODIMENTS

First, the examinations made by the present inventors to create the present invention will be described in detail.

The present inventors determined that the shape of the outermost surface of the disk changed by the order of one nanometer (nm) because of the sliding of the head slider mounted on the magnetic head against it and that the surface of the disk was thereby made level, increasing the horizontal resistance exerted on the head and causing head crashing or head stickiness when the head was stopped during the CSS (contact start-stops) operation, which led to cessation of rotation of the head. The present inventors thus found that to specify the maximum surface roughness and the height of the protrusions as the processing conditions of the texture processed surface of the disk substrate was not enough to explain the CSS characteristics and the durability of disk surface such as head crashing of the magnetic disk. The present inventors also noticed that no consideration was taken of the fact that the overall properties, including the configuration of the protrusions from the average surface and the configuration of the pits, as well as the properties of the three-dimensional bearing curve, which will be described later, were more important than the maximum surface roughness, and that no specification was therefore presented on the irregularities formed on the surface of the substrate which was necessary to improve head crashing and the CSS characteristics.

Figure 20:
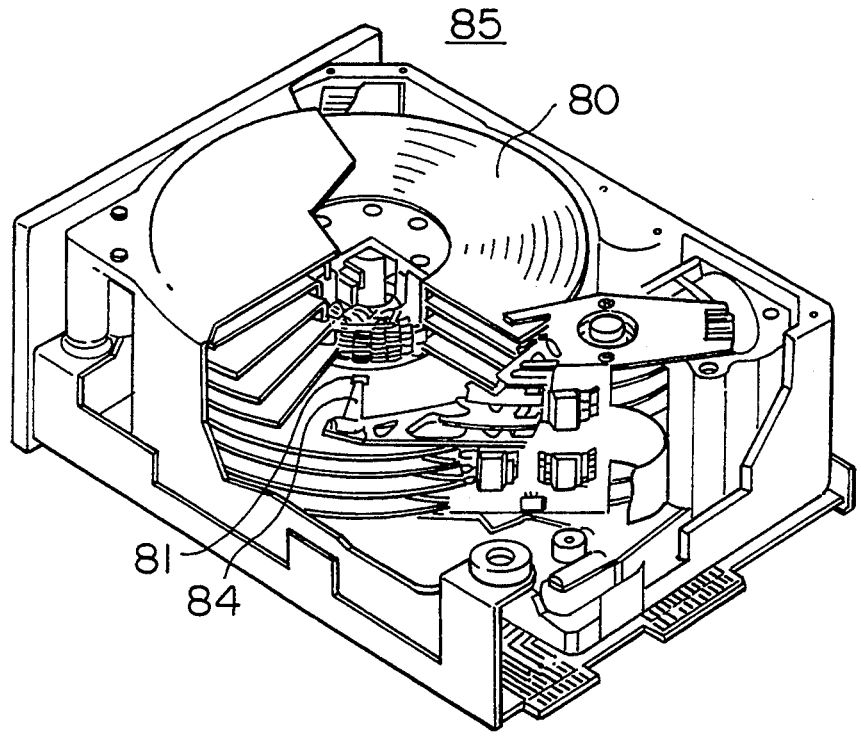
FIG. 20 is a perspective view, with parts broken away, of a magnetic disk unit according to the present invention.
Figure 21:
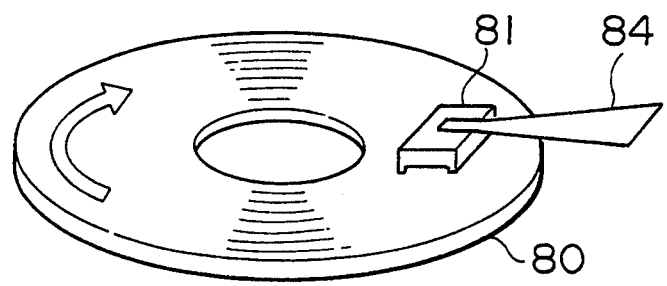
FIG. 21 illustrates the relation between a magnetic disk and a magnetic head.
Figure 22:
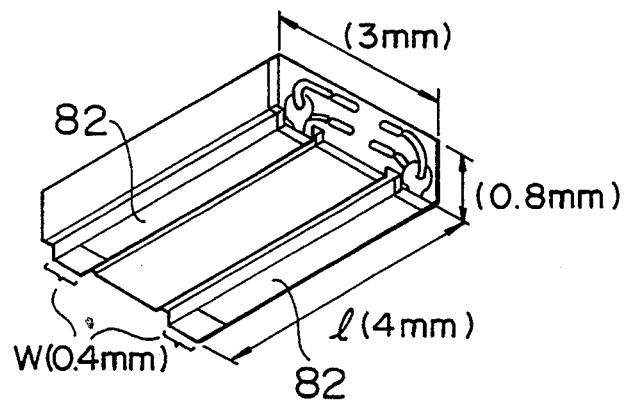
FIG. 22 is a perspective view of a head slider, showing the form of a magnetic head.
Figure 23A:
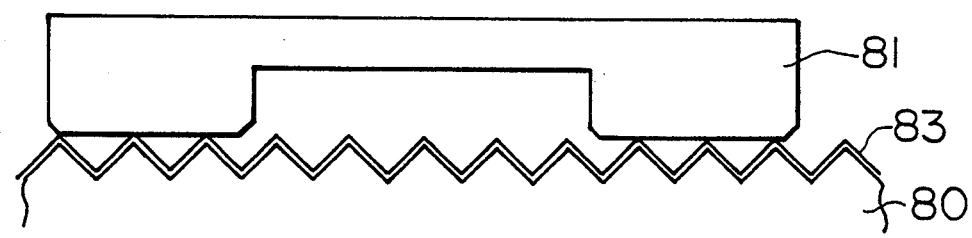
FIGS. 23A and 23B respectively show the relation in contact start-stop between the head and the surface of the disk obtained when the disk is at a stop and when the disk is rotating.
Figure 23B:
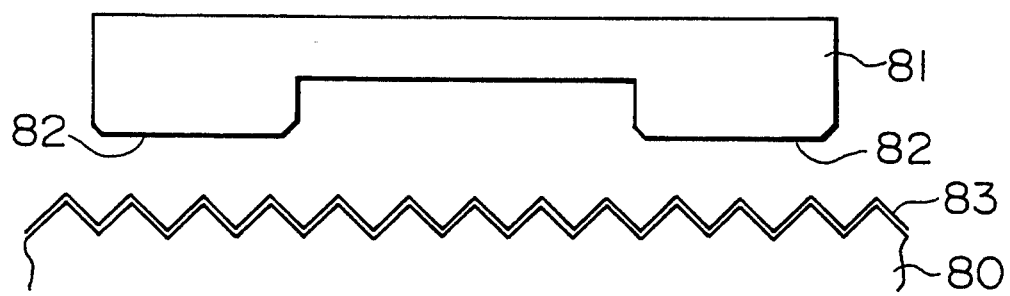

FIG. 20 shows part of a magnetic disk unit 85 as a sectioned perspective view. The magnetic disk unit 85 includes a plurality of magnetic disks 80 which are mounted coaxially and equally spaced, and magnetic heads 81 for writing data on and reading data from the corresponding surfaces of the disks. FIG. 21 schematically illustrates the relation between the disk 80 and the head 81 (also called a head slider) in the magnetic disk unit shown in FIG. 20. The head 81 is fixed to the forward end of an arm 84, and is respectively in contact with and slides against the surface of the disk when the disk is stationary and at the initial stage of the rotation of the disk due to the elastic force of the arm 84 applied thereon. Once the rotational speed of the disk has increased, the head 81 floats up to a position separated from the disk by a submicroscopic distance under the effect of air stream to the disk 80. These states of the head are illustrated in FIGS. 23A and 23B. FIG. 23A illustrates the state in which the head is in contact with the disk which is obtained when the disk is at a stop and when the head slides against the disk, and FIG. 23B illustrates the state in which the head floats up in the air which is obtained when the disk is rotating at a high speed. As shown in FIG. 22, the head 81 has a slider 82 which slides against the surface of the disk at each side thereof.

The surface of the head slider 82 has a width of 0.4 mm (w) and a length of 4 mm (l). The head slider 82 is mounted with its longer side being substantially directed in the circumferential direction of the disk. What counts regarding the irregular configuration of the surface of the disk is hence the irregular configuration with respect to at least a width w of head sliders i.e. a width of 0.4 mm or above.

The method of measuring the cross-sectional form of the surface of the substrate subjected to the texture process will be described now. Measurement was conducted in the radial direction of the substrate over a length corresponding to the width w of the head slider (e.g., 0.4 mm) or above using a surface roughness tester TALY STEP (manufactured by Rank Talor Hobson) which employed a stylus having dimensions of 0.1 $\mu m \times 2.5$ $\mu m$. The cross-sectional form of the surface of the substrate is represented by a curve. An output signal from TALY STEP was A/D converted, and the obtained digital signal was processed by a computer. The analog signal was sampled at intervals of less than 40 nm.

Figure 29:
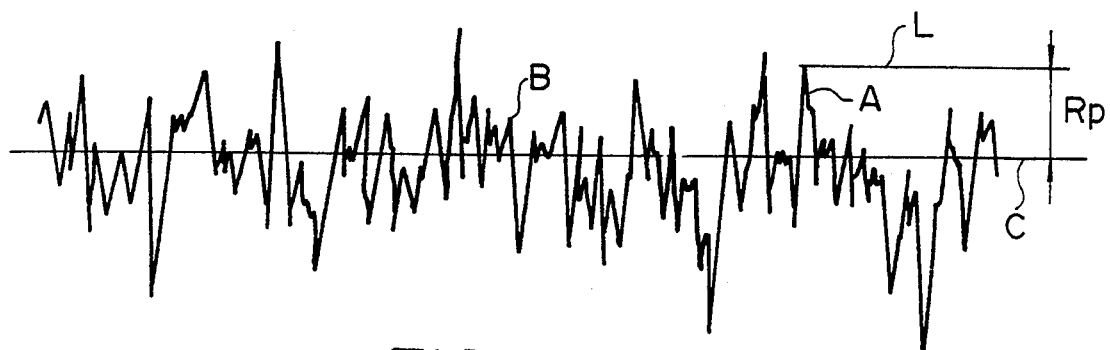
FIG. 29 shows fine protrusions in the sectional form of the texture processed surface.

Fine protrusions represent respective fine crests (called protrusions in this invention) which protrude from a central line C (FIG. 29) of the above-described cross-sectional curve obtained by conducting measurement in the radial direction of the substrate on which texture is formed in the approximately circumferential direction thereof or in a helical fashion. The height Rp of the fine protrusion represents the distance between the central line and the highest crest among the crests located within a unit length L measured in the radial direction of the substrate.

The symmetry of the cross-sectional curve, which is one of the surface characteristics of the texture processed surface, is expressed by Rsk obtained in the following equation in accordance with the known notation. If the cross-sectional curve is represented by function Y (i), then $$Rsk = \frac{1}{nRq^3} \left( \sum_{i=1}^{n} Y(i)^3 \right)$$

where Rq is the surface roughness-root-mean square which is expressed by $$Rq = \left\{ \frac{1}{L} \sum_{i=1}^{n} Y(i)^2 \right\}^{\frac{1}{2}}.$$

More specifically, in a case where Rsk representing symetry is a negative value, the sectional curve has a large pit component, and in a case where Rsk is a positive value, the sectional curve has a large protrusion component. Rsk=0 means that the ratio of the protrusion component to the pit component is equal and that the cross-sectional curve is symmetric with respect to the central line C.

Figure 30A:
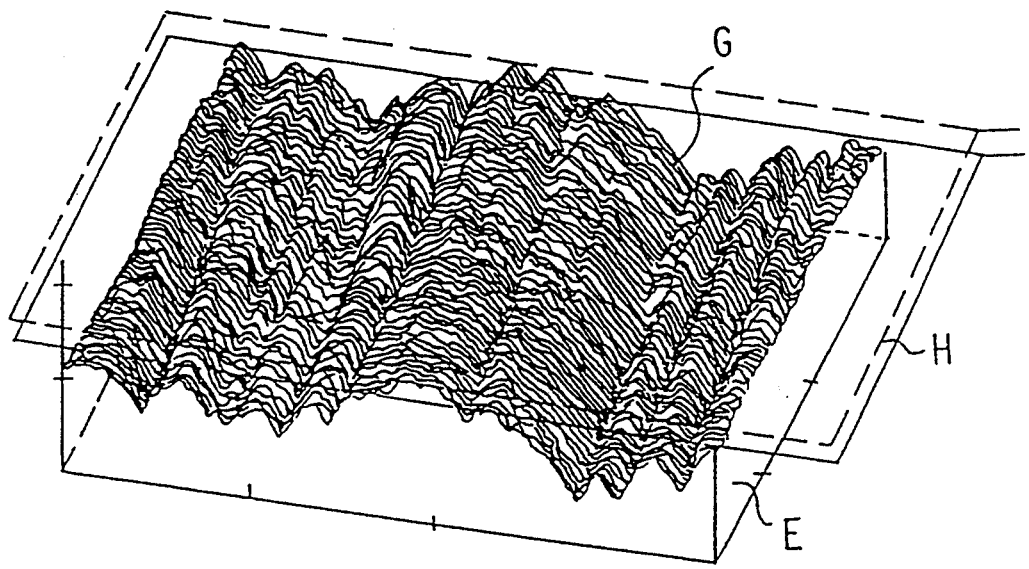

The method of three-dimensionally measuring the irregularities on the texture processed surface will be described below with reference to FIGS. 30A and 30B. FIG. 30A illustrates the results of the three-dimensional surface measurement G by means of Scanning Tunneling Microscope (STM) which will be described later. The three-dimensional surface is cut along an equally spaced plane H (whose depth from the outermost surface is Δhi) which is parallel to the average surface, and the area ratio obtained by dividing the area of the three-dimensional form at each section by the overall area thereof at a referential surface E which is located deeper than the irregular processed layer is plotted with respect to each section in the graph shown in FIG. 30B. In other words, the graph shown in FIG. 30B is a three-dimensional expressed bearing curve.

This three-dimensional bearing curve is similar to contents to the Abbott-Firestone (or bearing ratio) curve obtained from the two-dimensional cross-sectional curve, as shown in FIGS. 31A and 31B, and is the three-dimensional form thereof. The Abbott-Firestone curve is employed to estimate the sliding characteristics of, for example, a bearing. The present inventors observed and measured the contact of the head with the disk in terms of the state of the head sliding surface, the state of the disk surface, and motion of the head and disk during the CSS operation, and found that the three-dimensional bearing curve obtained by means of the STM is very effective as the method of estimating the surface of the disk with a high degree of accuracy in terms of the sliding characteristics thereof.

Figure 30B:
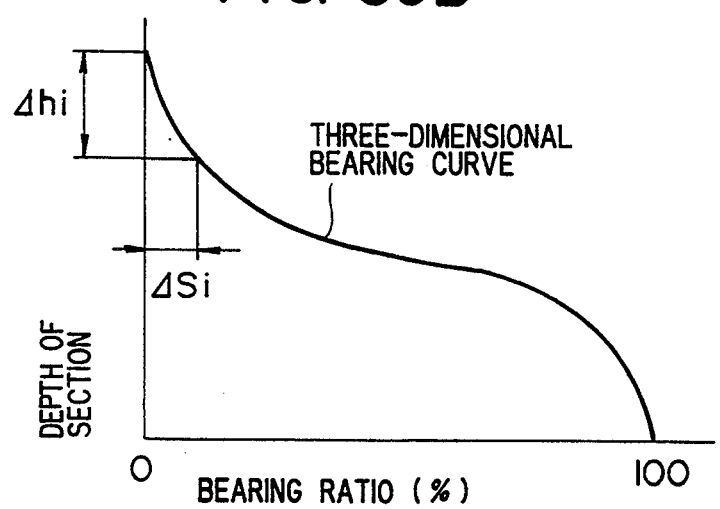

More specifically, as shown in FIGS. 30A and 30B, in the bearing curve, the three-dimensional configuration G of the surface is cut along a plane H which is equally spaced from the top of the three-dimensional configuration, and the area ratio (percentage) obtained by dividing the total area of the three-dimensional configuration at each section by the overall area of a referential surface E is plotted for each section. At the top portion of the surface configuration, the area of the surface configuration at the section is small, and the area ratio is thus small. In other words, if the sliding member is located on such a surface, it is supported only by the top portion of the surface configuration at the initial stage of the sliding. Thus, the pressure receiving area is small, and the pressure received by the unit pressure receiving area is large. In consequence, the top portion of the surface configuration easily wears or deforms by the friction caused by the sliding of the sliding member. In contrast, at the surface where the area ratio of the top portion of the surface configuration is large, i.e., at the surface configuration whose gradient of the bearing curve is small in the range where the area ratio is small in the three-dimensional bearing curve, the pressure receiving area is large in the initial stage of the sliding, and the pressure received by the individual fine protrusion to support the sliding member is thus small, providing improved sliding-resistance characteristics. Thus, the three-dimensional bearing curve is used to estimate the ability with which the surface against which the sliding member slides can receive loads.

The principle of another method of three-dimensionally measuring the texture processed surface will be described with reference to FIG. 24. This method employs a scanning electron microscope (SEM). The intensity of the signals a and b at an incident angle $\theta$ (gradient of a sample) of an electron probe are respectively detected by two secondary electron detectors A and B, and $\theta$ is obtained from the following general formula if the signal intensities at the incident angle of $\theta$ (which means that the electrons are incident onto a flat plane) are an and bn.

$$\tan \theta = k\{(a^2 - b^2)/(an + bn)^2\}$$

(where $k$ is a constant)

The thus-obtained gradients of the sample are integrated to obtain the surface configuration in the direction of X axis. An electron rays surface configuration analyzing device, manufactured by ELIONIX, may be employed as the measuring device.

The three-dimensional surface configuration can be measured by scanning the sample in the direction of Y axis.

Figure 56:
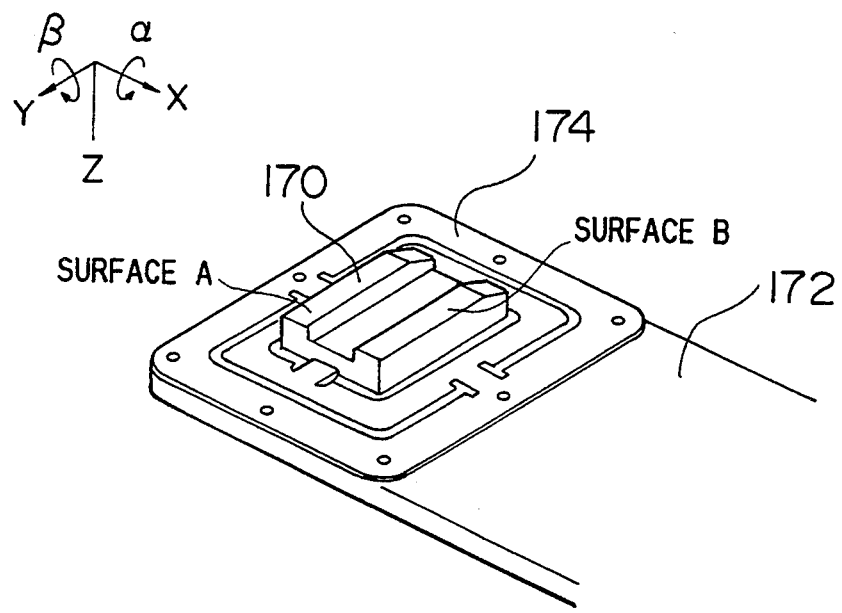
FIG. 56 is a perspective view of the contact side of a glass head employed in a Fizeau interferometer.
Figure 57:
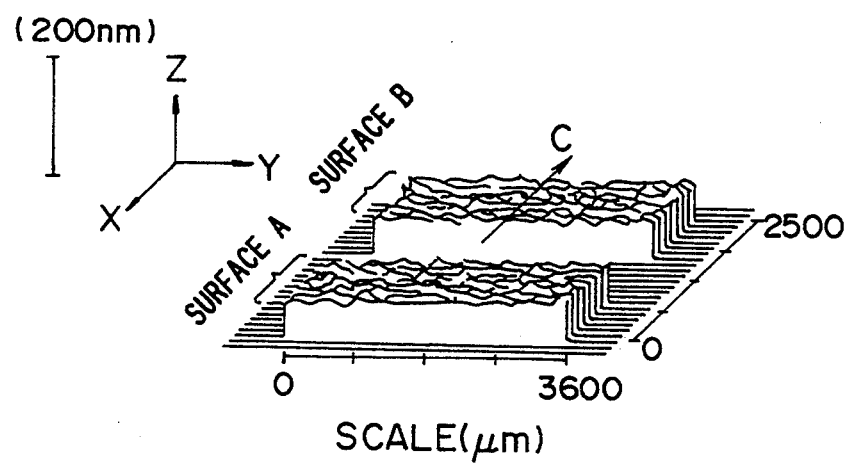
FIG. 57 shows an operation output obtained when the head of FIG. 56 is lightly brought into contact with the magnetic disk.
Figure 58A:
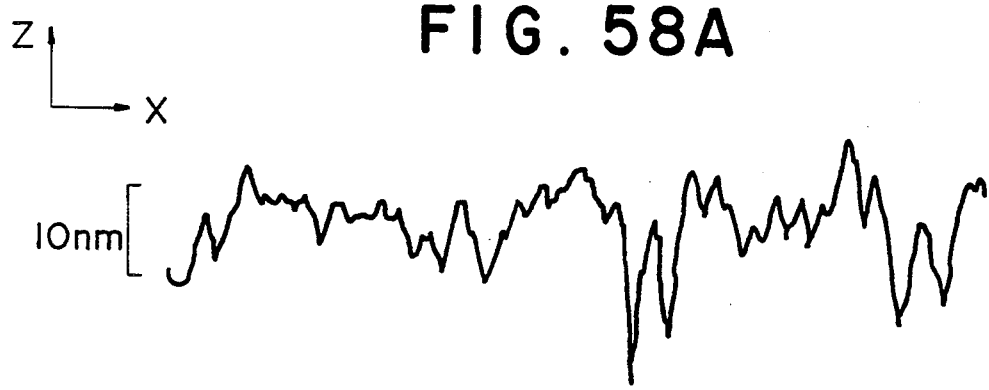
FIGS. 58A and 58B respectively show the sectional forms obtained in the direction indicated by C in FIG. 57 when no load is applied and when a head is pressed.
Figure 58B:

The three-dimensional bearing ratio can also be estimated by employing the principle of optical interference. In this method, the surface configuration of the substrate of a magnetic disk is measured when no load is applied thereto and when a load is applied thereto using a transparent glass head 170 mounted on a load applying arm 172 through a plate spring 174 such that it can apply a load to the substrate, as shown in FIG. 56, by means of the piezo interferometer (see page from 526 to 533 in "An analyzing device for Fizeau interferometer" 27.9 (1989) by Hikari Gijitsu Kontakuto), and the area of the substrate of the magnetic disk with which the substrate is in contact with the head when loads are applied is operated and indicated in the manner shown in FIG. 57. In that case, the overall measurement range is 5.5×5.5 mm, and the resolution on a horizontal plane is 10.9 μm. FIG. 58A is a graphic representation of changes in the surface configuration which are obtained by measuring the surface A in the direction indicated by the arrow C of FIG. 57 when no load is applied thereto, and FIG. 58B is a graphic representation of changes in the surface configuration obtained by the same measurement when loads are applied.

This method is capable of measuring changes in the vertical direction in the area corresponding to the dimension of the magnetic head (e.g., 3×4 mm), the real area of contact between the head and the disk obtained in a state when the head load is applied, the state in which the contact area increases as the head load increases, and changes in the contact state between the head and the disk which are obtained in the process in which the surface of the disk changes as the start-stop-cycles increases.

The present invention which is devised on the basis of the above-described knowledge will be described more concretely below.

The substrate of the magnetic disk is made of an aluminum alloy, anodic aluminum oxide, an aluminum alloy plated with Ni-P, glass or a plastic. In order to improve the characteristics, it is required that the surface of the substrate have a large number of uniform micro grooves and fine protrusions.

Figure 11:
FIG. 11 illustrates the sectional form of a micro groove.

These micro grooves and fine protrusions are formed on the surface of the substrate by means of a polishing tool such as a diamond bite or fine abrasive grains, and the fine protrusions are formed at the shoulders of the micro grooves as a consequence of formation of the micro grooves as the rising portions 36 shown in FIG. 11, as stated above. The height of the fine protrusion is determined by the depth or size of the pit 37, and the number of micro projections is determined by the processing conditions including the density of the fine abrasive grains or the tool feeding.

Figure 13:
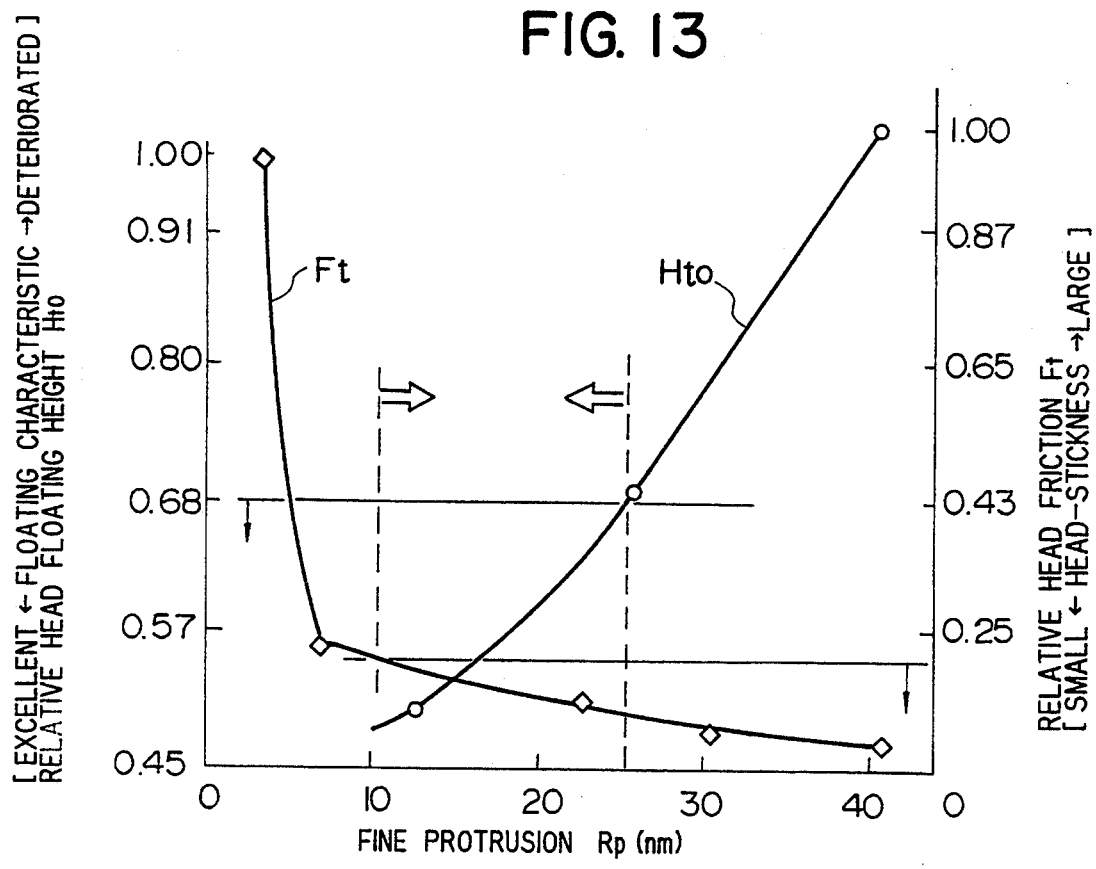
FIG. 13 shows the relation between the height of fine protrusions and the head flyability and the head-friction.
Figure 14:
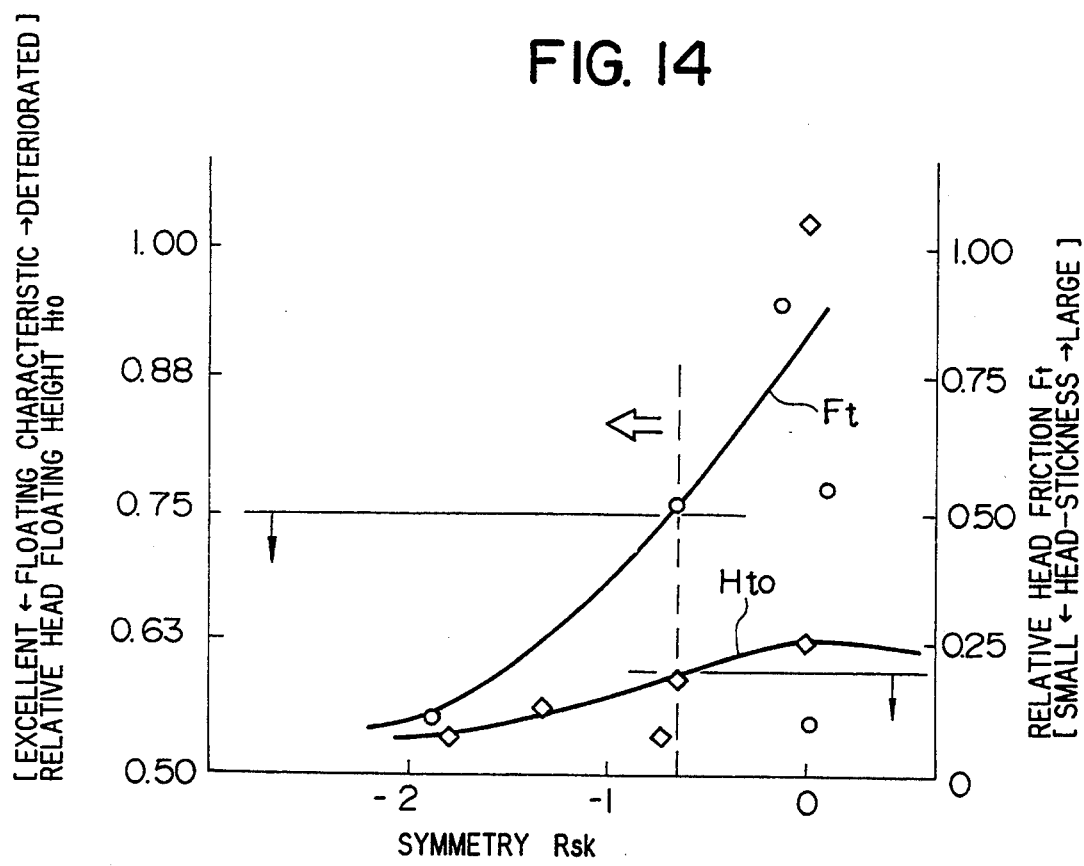
FIG. 14 shows the relation between the symmetry and the head flyability and the head friction.
Figure 32:
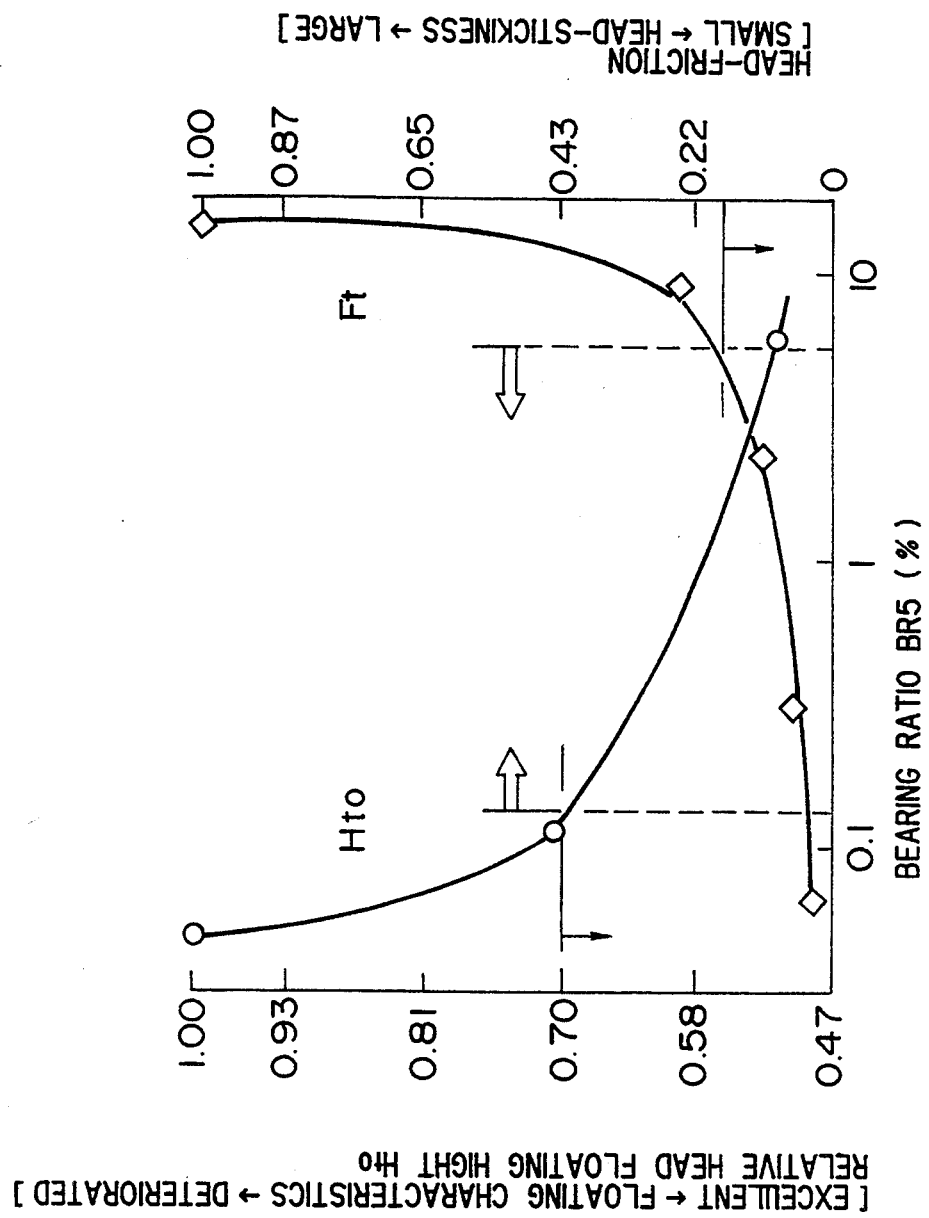
FIG. 32 shows the relation between the three-dimensional sectional bearing ratio and the head flyability and the head-friction.

The requirements of the surface characteristics of the magnetic disk are to satisfy the various types of characteristics of the magnetic disk, including the electrical characteristics, the CSS characteristics and the head-stickiness characteristics, without causing head crashing. The gap between the floating head and the disk is reduced in order to achieve high-density magnetic disks. So, it is required that the surface of the disk is made high-smooth to avoid collision of the head against the disk. From the viewpoint of reduction in the head access time, so-called contact-start-stop (hereinafter referred to as a CSS) is conducted on the head 81 and the disk 80, as shown in FIGS. 23A and 23B, in which the head 81 is in contact with the disk 80 when it is at a stop and in which the head floats up while the disk is rotating. In consequence, in a case where the surface of the disk 80 has a smooth surface, i.e., the surface has a very small surface roughness, head adhesion occurs while the head is at a stop due to the lubricant 83 coated on the surface of the disk or the water contents in the air, damaging the gimbal or the arm which supports the head or causing cessation of rotation of the head. FIGS. 13, 14 and 32 respectively show the results of the experiments made by the present inventors, i.e., the relation between the height of the fine protrusions formed on the substrate using the polishing tapes by means of the texture process (which will be described in detail later) and the head floating characteristics and the head-stickiness, the relation between the symmetry of the cross-sectional curve of the texture processed surface and the head floating characteristics and the head-stickiness force, and the relation between the three-dimensional bearing ratio and the head floating characteristics and the head-stickiness.

More specifically, FIG. 13 shows the relation between the height of the protrusions and the head floating position HtO which represents the floating characteristics and the head-friction Ft which is the barometer of the head-stickiness, FIG. 14 shows the relation between the symmetry Rsk and the Hto and Ft, and FIG. 32 shows the relation between the three-dimensional bearing ratio (at the section which is 5 nm deep from the topmost portion) and Hto and Ft. The head floating position Hto and the head-friction Ft are measured as follows:

(i) Measurement of head floating position Hto:

A magnetic disk unit having the same structure as that of the disk unit shown in FIG. 20 is employed. An acoustic emission (AE) or Piezo sensor is mounted on the head 81 beforehand. As the disk 80 starts rotating, the head 81 starts floating. The state at that time in which the disk is in contact with the head is detected by the AE sensor. The rotational speed of the disk at which the output signal from the AE sensor suddenly drops is measured.

The head floating characteristics at various rotational speeds of the head are examined beforehand, and the head floating position Hto is obtained from those head floating characteristics.

(ii) Measurement of head-friction Ft

The head sliding resistance at 1 rpm is measured by a strain gage mounted on the supporting arm 84 of the head 81.

From the results of the experiments, it can be seen that there exists the effective range of the conditions of the surface characteristics that can satisfy both the head floating characteristics and the head-friction, i.e., in which the floating position Hto is small and in which the head-friction Ft is small. More specifically, it can be seen that the floating position Hto is small and the tangential force Ft is small when the height Rp of the fine protrusions is between several nm and several tens of nm, and more preferably, in the range indicated by the arrow in FIG. 13, when the symmetry Rsk shown in FIG. 14 is negative, more preferably, in the range of $Rsk \leq -0.7$ which is indicated by the arrow in FIG. 14, and when the three-dimensional cross-section bearing ratio is between 0.1 and 10%, and more preferably, between 0.24 and 8.5%. As shown in FIG. 32, the effective lower limit of the bearing ratio is determined by the floating characteristics, whereas the effective upper limit of the load ratio is determined by the head stickiness (represented by the head tangential force Ft).

The relation between the surface characteristics and the CSS characteristics will further be described with reference to FIGS. 27A to 28B.

Figure 27A:
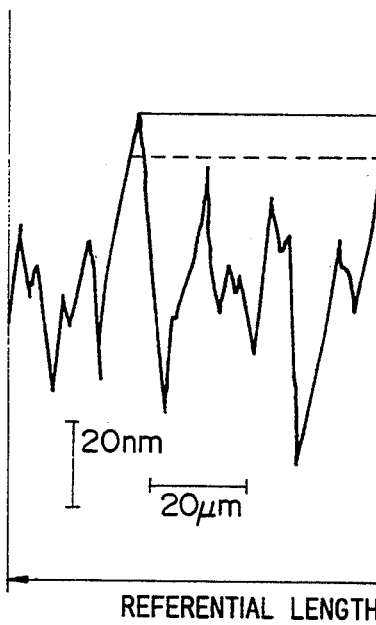
FIGS. 27A, 27B, 28A and 28B show the relation between the cross-sectional form of the texture processed surface and the three-dimensional bearing curve thereof.

FIG. 27A shows the cross-sectional form of the surface of the substrate subjected to the texture process using the fine abrasive grains, in which the height of the fine protrusions is varied to a large extent.

Figure 27B:
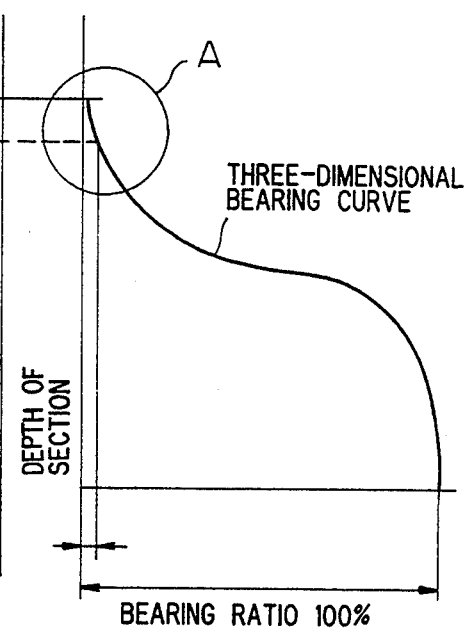
Figure 28A:
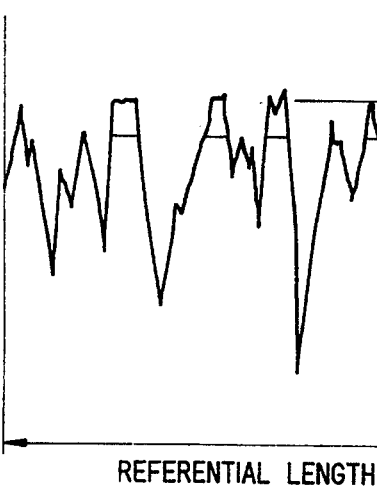
Figure 28B:
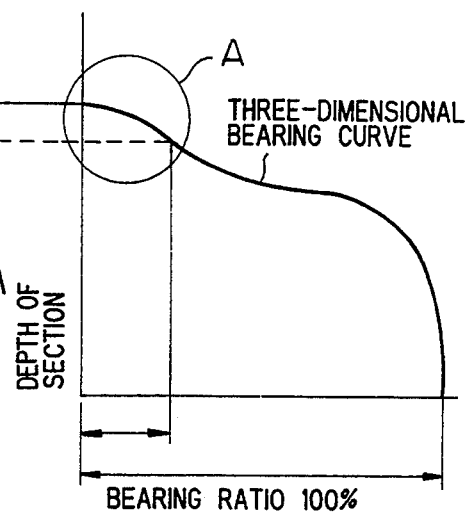

FIG. 27B shows the three-dimensional bearing curve of this texture processed surface. The gradient of this bearing curve is large in the range in which the cross-sectional area ratio is small, i.e., in the range A in FIG. 27B. When the CSS drive is repeatedly conducted on the surface shown in FIG. 27A, since the area of the fine protrusions with which the head slider makes contact is small and the surface pressure W/S (W: head loads, S:

the real area of contact between the head slider and the disk) is thus large, the surface of the substrate wears or deforms to a large extent, greatly damaging the lubricating film having a thickness of several nm and the protective film having a thickness of several tens of nm, which are formed on the substrate in which the fine protrusions are formed. Wear or deformation of the fine protrusions caused by the CSS drive is great when the yield strength $\sigma$ is smaller than W/S. When the yield strength $\sigma$ is equal to or larger than W/S, the wear or deformation is low. Assuming that the fine protrusions has worn or deformed by the CSS drive and that the real area of contact has thereby increased to an extent which satisfies $\sigma \geq W/S$, and that the protective film and the lubricant film remain in a complete form, wear or deformation of the fine protrusions would be substantially eliminated, and stable surface would be provided. Hence, the surface of the substrate having the cross-sectional form shown in FIG. 27A is further processed to make the fine protrusions smooth, as shown in FIG. 28A. In FIG. 28A, the shape of the flattened fine protrusions is generalized as trapezoidal. When the real area of contact between the head slider and the disk surface is increased until it has a configuration which ensures $\sigma \geq W/S$ in the initial state, the surface pressure of the fine protrusions is reduced, substantially eliminating wear or deformation of the fine protrusions. This results in the provision of a stable and highly reliable surface of the magnetic disk. FIG. 28B shows the three-dimensional bearing curve of the surface configuration shown in FIG. 28A. It can be seen in FIG. 28B that the gradient of the portion A of the bearing curve which represents the surface layer is very small.

The portion of the conventional texture processed surface having the surface configuration shown in FIG. 27A which corresponds to the surface of the head slider (having dimensions of, for example, 0.4 mm×0.4 mm) exhibits the three-dimensional bearing curve in which the sectional area ratio at a section taken at a depth of 5 nm to 10 nm from the top of the surface configuration is 0.1% or less. The present inventors conducted the CSS drive on the magnetic disk having such a substrate, and found that head crashing occurred when the magnetic disk was driven 2000 times or less. The surface shown in FIG. 28A exhibits a three-dimensional bearing curve in which the sectional area ratio at a section taken at a depth of 5 nm to 10 nm is between 0.1% to 10%. The present inventors performed the start-stop-cycles on the magnetic disk having the substrate surface shown in FIG. 28A, more than 20000 times, and found that both the protective film and the lubricant film maintained their functions and the surface of the substrate was in a stable condition.

Figure 15A:
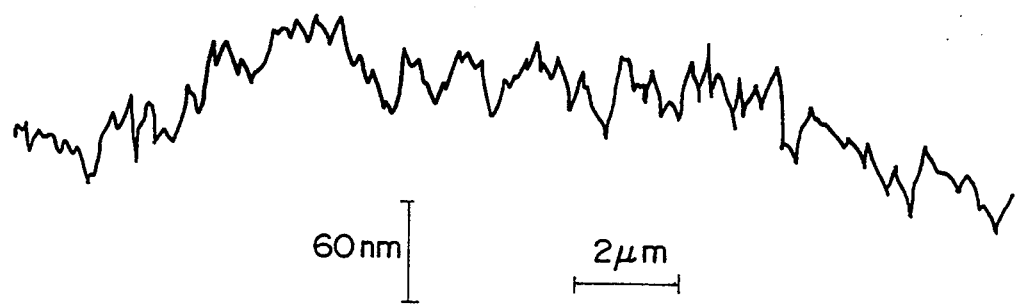
FIGS. 15A and 15B respectively show the sectional form of the surface of the substrate obtained by measuring fine changes in the surface prior to the CSS drive and after the CSS drive in the order of nanometer by a high-resolution SEM.
Figure 15B:
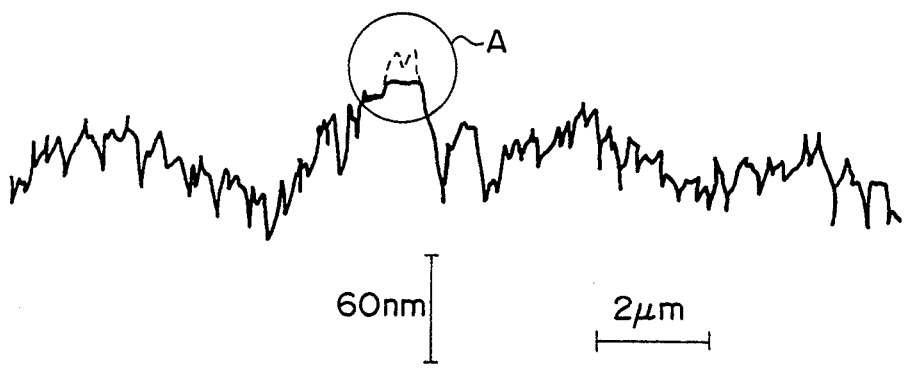
Figure 16:
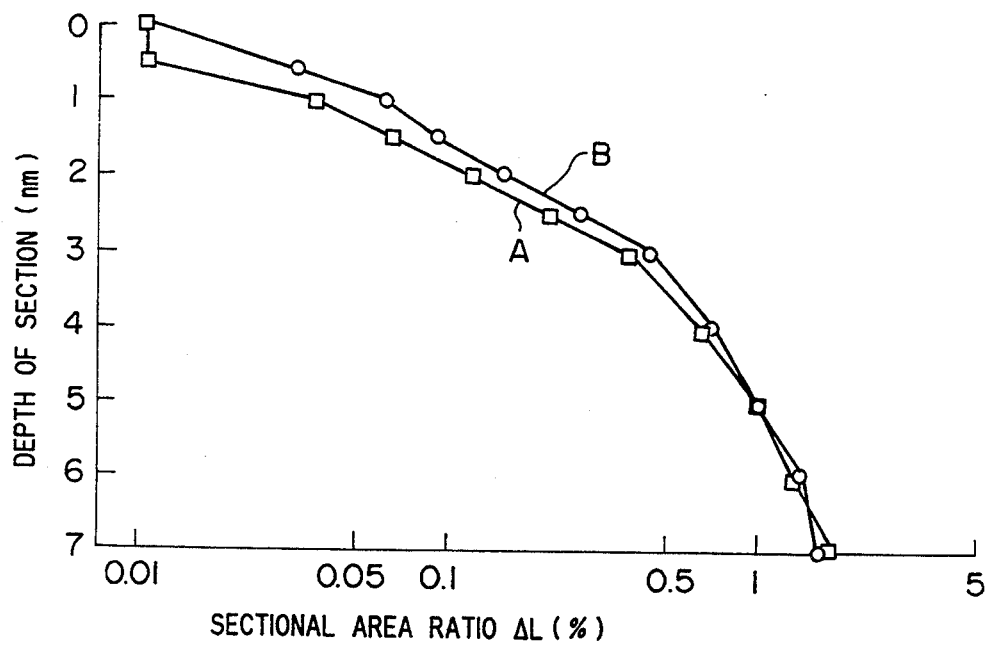
FIG. 16 shows three-dimensional bearing curves of the surface layer of the substrate which are obtained before and after the CSS drive.

Also, the present inventors intensively examined changes in the surface of the magnetic disk caused by the CSS drive. The present inventors performed the CSS test on the texture processed surface, and found that, as the magnetic head was repeatedly caused to slide against the top portion of the fine protrusions, the top portion was made flat and the area of the fine protrusions with which the head makes contact increased, as shown in FIGS. 15A and 15B which show the results obtained by the SEM observations on the surface of the disk and in FIG. 16 which shows the three-dimensional bearing curves of the surface layer of the disk. More specifically, FIG. 15A shows the initial surface configuration, and FIG. 15B shows the state of the surface which deformed after the head was repeatedly caused to slide against it. The bearing curve B in FIG. 16 represents the characteristics of the surface layer shown in FIG. 15A, and the bearing curve A in FIG. 16 represents the characteristics of the surface layer shown in FIG. 15B on which sliding was repeatedly conducted. After the start-stop-cycles was conducted on the surface 20000 times, the top portion of the protrusions having a height of 5 to 10 nm changed as a consequence of contact with the slider surface of the magnetic head, as shown in portion A in FIG. 15B. As shown in FIG. 16 which shows the three-dimensional bearing curves representing the surface of the disk, as the top portion of the fine protrusions having a height of 5 to 10 nm changed, the area ratio at the section of the surface of the disk with which the magnetic head is made contact is increased to 0.1% to several percent. Furthermore, when the height of the fine protrusions was several tens of nm or above, the magnetic head floating characteristics deteriorated, and head crashing easily occurred. Even though the height of the fine protrusions was 5 nm or less, when the cross-sectional area ratio was small, the surface of the substrate which supported the loads of the head during the CSS test, i.e., the area of the fine protrusions on which the loads were applied, was small, and the fine protrusions were thus flattened immediately according to the start-stop-cycles. As a result, the head-friction increased, and head crashing easily occurred.

Furthermore, when the load area of the fine protrusions was small, the pressure received by the individual fine protrusions was large, and the fine protrusions were thus easily flattened or wore. As a result, the lubricant layer and the protective layer, formed to a thickness of several nm on the surface of the substrate, were easily damaged. Furthermore, when the sectional area ratio was 10% or above and the load area was thus large, changes in the fine protrusions on the substrate caused by the magnetic head were less. However, head adhesion easily occurred by means of the lubricant or the water contents in the air due to the large contact area. Furthermore, sliding resistance of the magnetic head increased during the CSS drive, and the gimbal or arm of the magnetic head was thereby damaged and rotation of the disk was difficult.

Thus, in terms of the head floating characteristics and changes in the surface character due to the head load and the friction generated by the sliding head, it is preferable that the height of the fine protrusions formed on the texture processed surface of the substrate is between several nm and several tens of nm, that the roughness Ra of the texture processed surface is between several nm and several tens of nm, that the symmetry Rsk of the sectional curve of the texture processed surface is negative, preferably, −0.7 or less, and more preferably, −1 or less, and that, in the three-dimensional bearing curve of the texture processed surface, the sectional area ratio at the section corresponding to the portion which is deformed by the head load during the CSS drive, i.e., at the section taken at a depth of 5 to 10 nm from the top portion, is between 0.1% and 10%.

Figure 6:
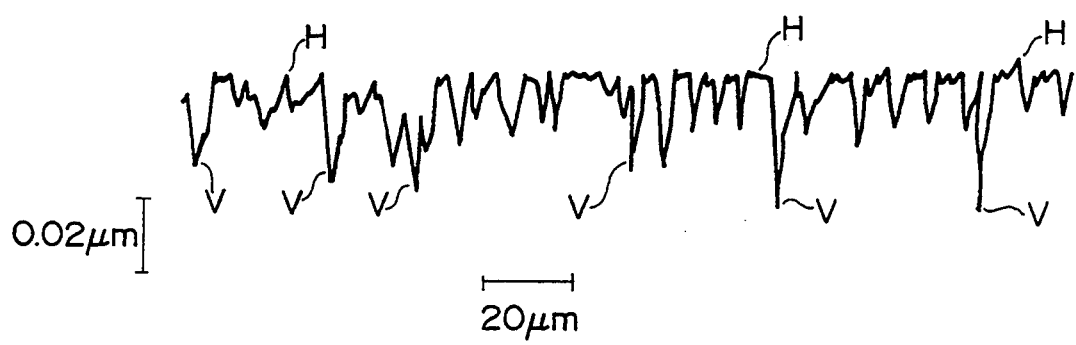
FIG. 6 is an enlarged graphic representation of a sectional curve of the surface which is processed by a second processing head H2.
Figure 7:
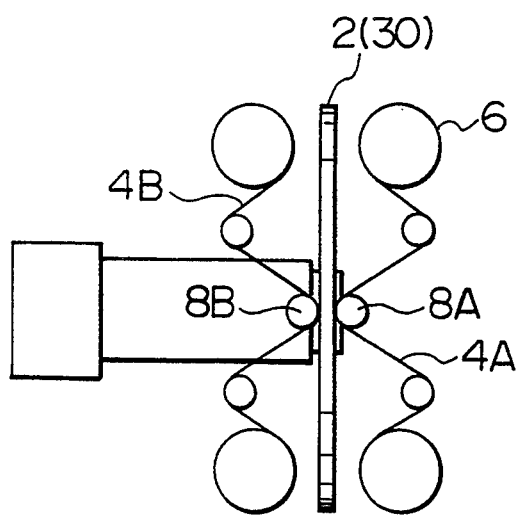
FIG. 7 is a front view of a conventional substrate processing apparatus for forming micro grooves.
Figure 8:
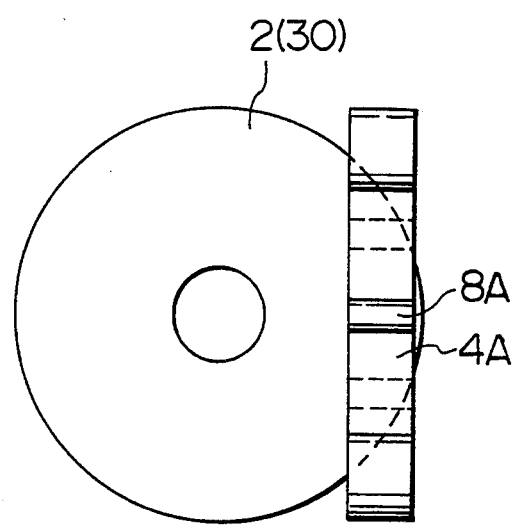
FIG. 8 is a side elevational view of the substrate processing apparatus of FIG. 7.

From the above-described viewpoints, the optimal surface of the substrate of the magnetic disk is defined as follows: in the cross-sectional form of the texture processed surface of the substrate in which micro projections are formed in the pseudo-circumferential direction thereof, as shown in FIG. 6, the height of the fine protrusions is between several nm and several tens of nm and is uniform, the surface roughness Ra is several nm and several tens of nm (preferably, between 2 nm and 9 nm), the symmetry Rsk of the cross-sectional curve is equal to or less than −1, and the sectional area ratio at a section taken at a depth of 5 to 10 nm from the top of the surface is between 0.1% and 10%.

Furthermore, in order to maintain smooth sliding of the head against the disk, the texture processed surface of the disk must have deep grooves V within the unit width which is the width of the slider, as shown in FIG. 6. The depth of the deep grooves V is preferably 100

The surface of the disk, which has fine protrusions whose height is between several nm and several tens of nm, whose roughness Ra is between several nm and several tens of nm, which exhibits a cross-sectional curve whose symmetry Rsk is −0.7 or less, more preferably, −1 or less, and which exhibits a three-dimensional bearing curve in which the sectional area ratio at the section corresponding to the portion which is deformed by the head load during the CSS drive, i.e., at a section taken at a depth of 5 to 10 nm from the top of the surface, is between 0.1% and 10%, has the following advantages: it can receive a desirable head load when it makes contact with the surface of the slider of the head during the CSS drive. The lubricant film coated on the surface of the magnetic disk can be maintained and adhesion of the magnetic head can be prevented by means of the irregularities formed in the surface of the disk. The debris generated by the sliding of the head can be eliminated by means of the deep pits in the surface of the disk. Furthermore, since a large number of fine protrusions make contact with the surface of the head slider and since the sectional area ratio at a depth of preferably 5 to 10 nm from the top of the fine protrusions, in which deformation occurs due to sliding of the head, is between 0.1% and 10%, the pressure received by the respective fine protrusions is small, and changes in the fine protrusions caused by repeating the CSS drive, i.e., deformation or wear thereof, is thus less. This enables the initial surface character to be maintained. Furthermore, since the height of the fine protrusions is between several nm and several tens of nm, which is very small as compared with the gap between the floating magnetic head and the surface of the disk (obtained in a normal state) of 80 to 250 nm, even if the magnetic disk assembly accuracy, the rotational accuracy of the magnetic disk and variations in the floating of the magnetic head are taken into consideration, the magnetic head can be caused to float up with enough space between the head and the top portion of the fine protrusions. This eliminates head crashing.

In consequence, the magnetic disk according to the present invention has substantially no wear or damage on the protective film and the lubricant film formed to the thickness of several nm on the surface thereof, has no head adhesion, eliminates an increase in the head-friction caused by repeatedly conducting the CSS drive, and therefore exhibits excellent head floating characteristics and durability of disk surface and is high reliable.

Embodiments of the present invention will now be described concretely.

An aluminum alloy plate having an inner diameter of 40 mm and an outer diameter of 130 mm was used as the disk substrate. The two surfaces of the aluminum alloy plate were Ni-P plated to a thickness of 10 $\mu$m, and the plated surfaces were then polished to a surface roughness Ra of 2 to 3 nm or less. Thereafter, the plated surfaces were further polished using the polishing tapes such that they exhibited a cross-sectional form shown in FIG. 17 in which the height of the fine protrusions formed at the shoulders of the micro grooves was between several nm and several tens of nm and was uniform, in which the surface roughness Ra was between 5 and 8 nm, and in which the symmetry Rsk of the sectional curve was between −1 and −2. The cross-sectional form shown in FIG. 17 was obtained by measuring the surface of the disk in the direction perpendicular to the direction in which the grooves were formed using the surface roughness tester TALY STEP whose tracer had dimensions of 0.1 $\mu$m×2.5 $\mu$m. The method of manufacturing such a disk substrate will be described later.

Figure 9:
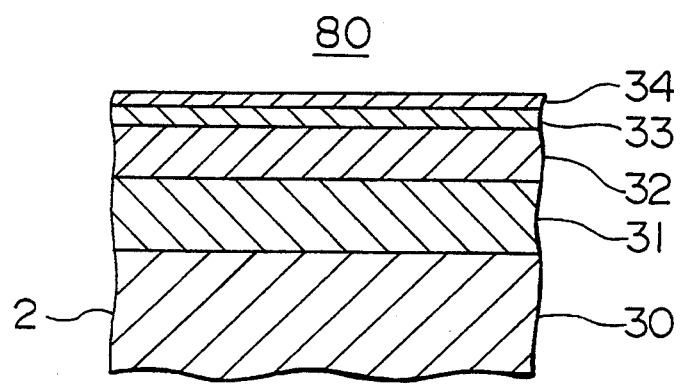
FIG. 9 is a sectional view of a thin film magnetic disk in which a substrate according to the present invention is employed.
Figure 10:
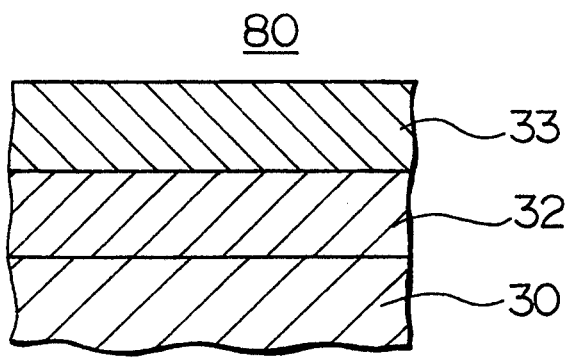
FIG. 10 is a sectional view of a conventional thin film magnetic disk.

Subsequently, the Cr type non-magnetic metal film 31 and the Co-Ni type magnetic film medium 32 were formed in sequence to thicknesses of about 300 nm and about 60 nm, respectively, on the substrate of the disk by the sputtering technique, as shown in FIG. 9. Thereafter, the carbon protective film 33 having the thickness of about 50 nm and the lubricant film 34 were formed in sequence.

Figure 17:
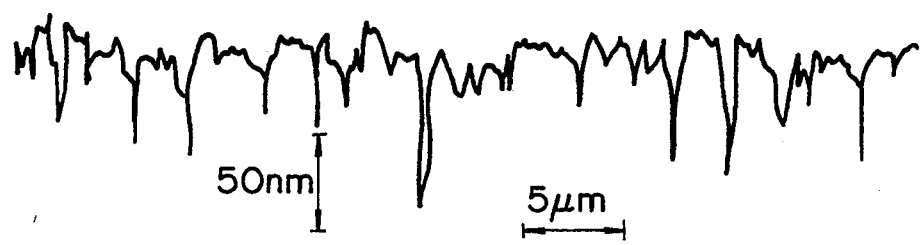
FIGS. 17 and 18 respectively show the sectional form of the surface of the magnetic disk on which the substrate according to the present invention is formed and of the magnetic disk on which a magnetic medium in the form of film is formed on the substrate.
Figure 18:
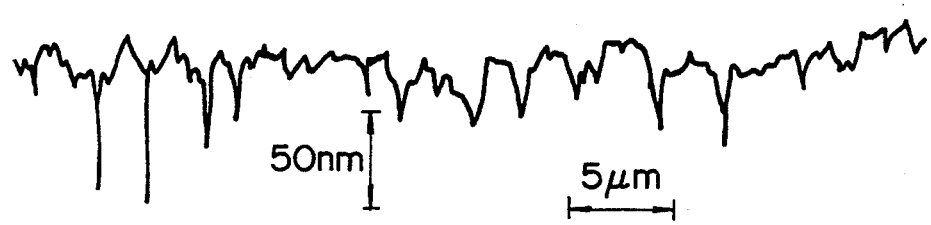

The surface configuration of the thus-manufactured magnetic disk was almost the same as that of the disk substrate shown in FIG. 17, as shown in FIG. 18. That is, the surface roughness Ra of the surface of the magnetic disk was 5.5 nm (while that of the substrate was 5.3 nm), the height Rp of the fine protrusions was 19 nm (while that of the substrate was 20 nm), and the symmetry Rsk of the cross-sectional form was almost the same as that of the substrate.

A plurality of such magnetic disks were incorporated in a magnetic disk unit in the same manner as that in which the disks were incorporated in the magnetic disk unit shown in FIG. 20, with a floating gap of 0.13 $\mu$m. No contact of the head with the surface of the disk was detected, and the disk exhibited the excellent floating characteristics. Furthermore, substantially no change in the surface configuration of the magnetic disk occurred as the start-stop-cycles was advanced.

Figure 19:
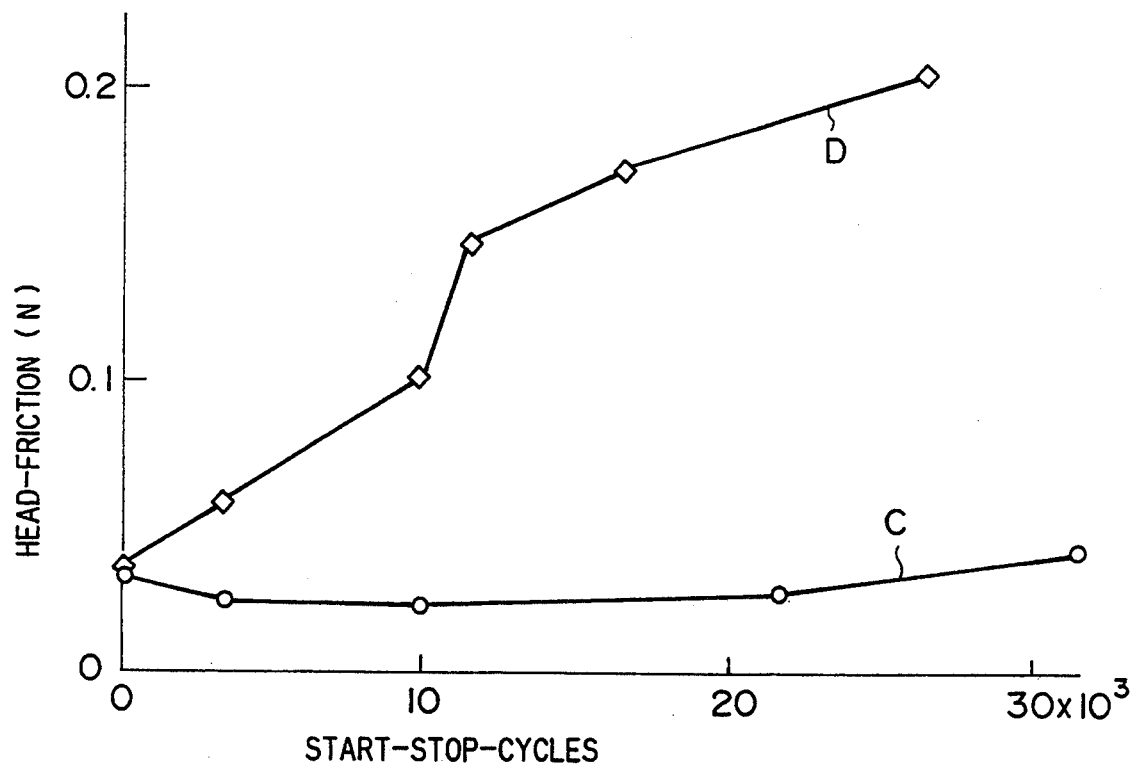
FIG. 19 shows the relation between the CSS cycles and the head-frictions.

FIG. 19 is a characteristic curve showing the relation between the start-stop-cycles and the head-friction (in unit of newton) obtained in the present embodiment and that of the conventional disk. A characteristic curve C indicates the relation obtained in the present embodiment, and a characteristic curve D indicates that of the comparison example. As seen from the graph in FIG. 19, in the case of the present embodiment, there was substantially no increase in the head-friction and no head adhesion occurred when the start-stop-cycle was conducted 30,000 times. It was therefore possible to greatly improve the reliability of the magnetic disk and that of the magnetic disk unit.

Figure 5:
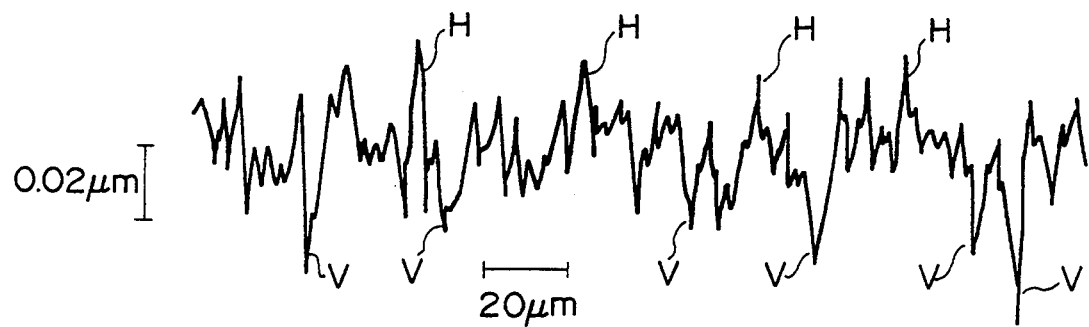
FIG. 5 is an enlarged graphic representation of a sectional curve of the surface of the substrate which is processed by a first processing head H1 of the substrate processing apparatus of FIGS. 1A and 1B.

In the magnetic disk in which the substrate formed by the conventional technique had micro grooves of a cross-sectional form shown in FIG. 5 and exhibited the characteristic curve D shown in FIG. 19, the head-friction D increased and damage to the magnetic head and head crashing occurred as the start-stop-cycles advanced. Furthermore, the cross-sectional form of the surface of the disk greatly changed when start-stop-cycle were repeated.

The method of manufacturing the substrate of this embodiment will be described below.

A Ni-P plated film is formed on the two surfaces of an aluminum alloy disk substrate to a thickness of 10 $\mu$m by the electroless plating technique, and the plated surfaces are then polished until they have a surface roughness Rmax of 0.01 $\mu$m to make them smooth. Next, a first polishing process, which employs a polishing tape to which alumina abrasive grains having a grain size of #3000 are fixed is conducted on the Ni-P plated surfaces of the substrate to form micro grooves in the Ni-P plated surfaces of the substrate.

Such a surface processing method is described in, for example, Japanese Patent Unexamined Publication No. 54-23294. In this method, micro projections are formed in the two surfaces of the substrate in an approximately circumferential direction thereof or in a helical fashion by pressing the polishing tapes 4 against the two surfaces of the substrate 30 by means of the contact rollers 8 and by moving the polishing tapes back and forth along the surfaces of the substrate so that they can slide against the overall surfaces of the substrate while winding around the reels 6.

On the surfaces of the substrate which are subjected to the above-described surface process, abnormal fine protrusions having a height of 100 nm or above are present at the shoulders of the deep pits. These may cause deterioration in the head floating characteristics and the head crashing accidents. Consequently, a second polishing process, which employs a polishing tape whose grain size is smaller than that of the polishing tape employed in the first polishing process, is conducted in a similar manner on the surfaces of the substrate. As the result of this second polishing process, the abnormal height of the fine protrusions is reduced, and the top portions of the large number of fine protrusions are made flat, resulting in the provision of a surface shown in FIG. 6 in which the fine protrusions H are made flat and in which deep pits V are present in predetermined intervals.

Between the first and second polishing processes, a surface cleaning process of the substrate is conducted to remove dirt such as debris generated by the first polishing process. The end of the second polishing process is detected on the basis of the three-dimensional bearing curve obtained on the basis of the principle of the SEM shown in FIG. 24. The second polishing process is ended at a point on the bearing curve obtained by means of the STM shown in FIG. 30 at which the condition that sectional area ratio at the section taken at a depth of 5 to 10 nm from the top of the fine protrusions is between 0.1% and 10% is satisfied.

Next, an example of an apparatus for texture processing the surface of the disk substrate, which is suitably employed when the magnetic disk according to the present invention is manufactured, will be described.

Figure 1A:
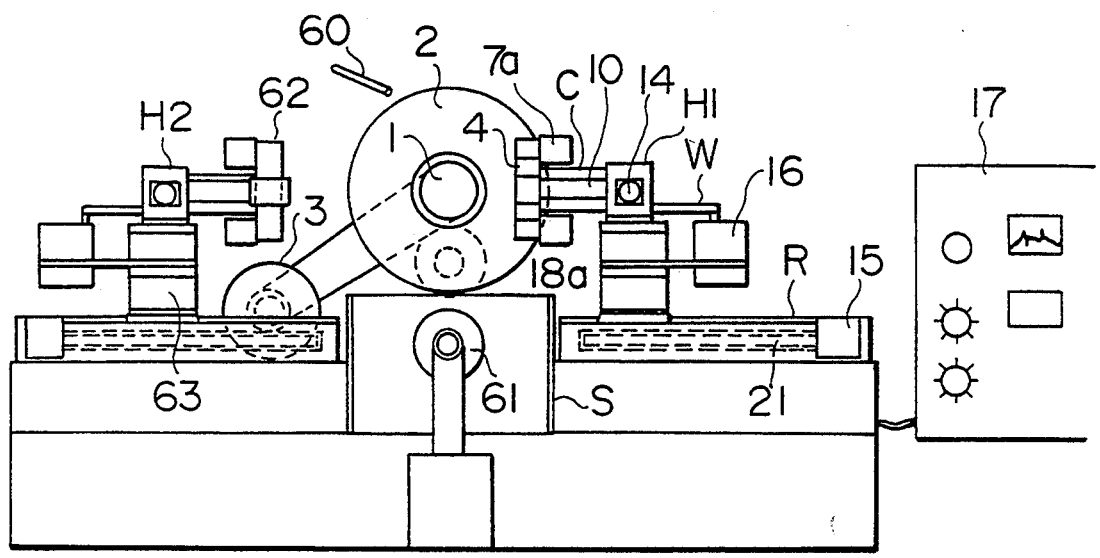
FIGS. 1A and 1B are respectively front views of an embodiment of a substrate processing apparatus according to the present invention.
Figure 1B:
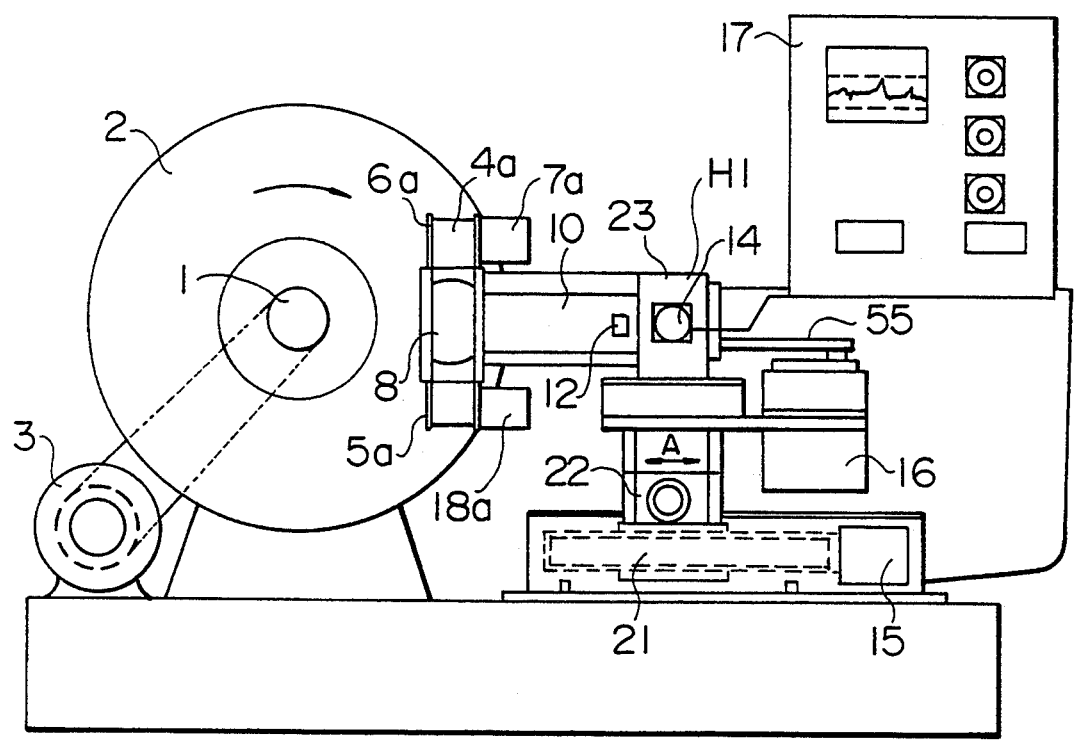
Figure 2A:
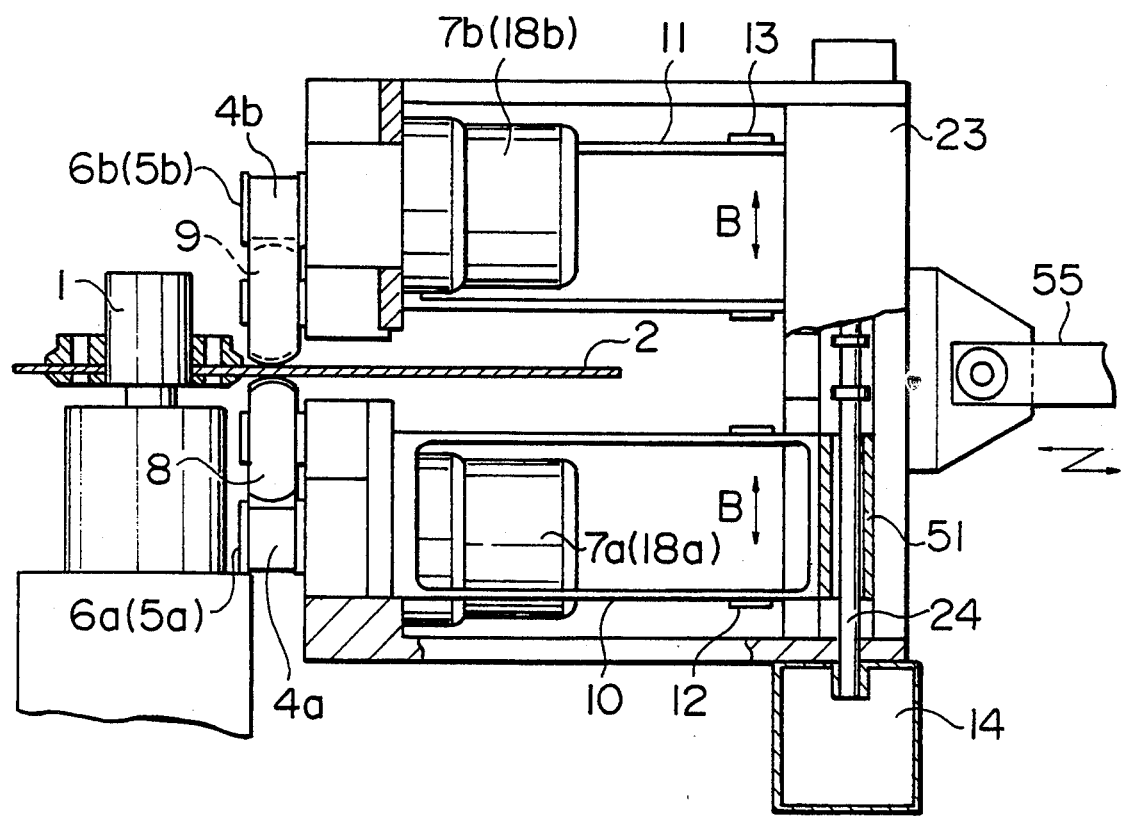
FIG. 2A is a plan view of the essential parts of the apparatus of FIGS. 1A and 1B whose main part is a head.
Figure 2B:
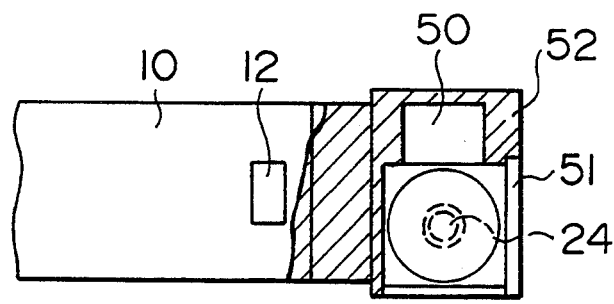
FIG. 2B is a partial section of FIG. 2A.
Figure 3:
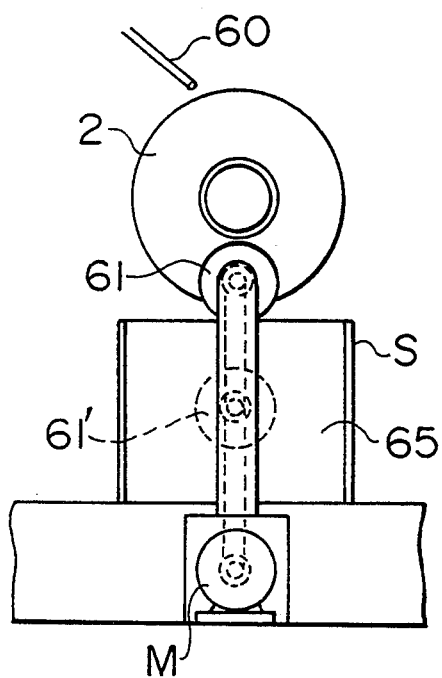
FIG. 3 is a front view of a substrate washing means in the apparatus of FIGS. 1A and 1B.
Figure 4:
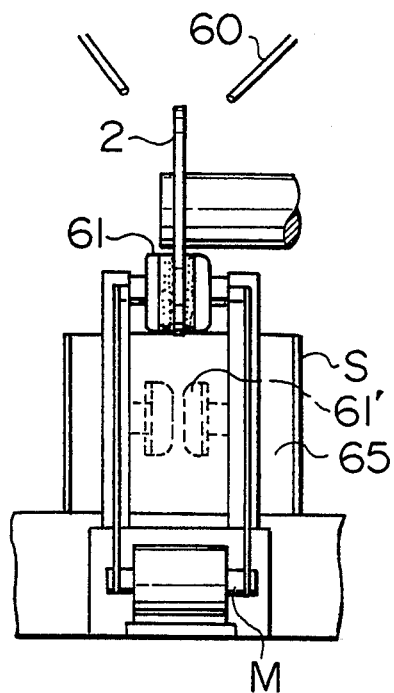
FIG. 4 is a side elevational view of the substrate washing means.

First, the structure of the texture processing apparatus will be described with reference to FIGS. 1A, 1B, 2A, 2B, 3 and 4. FIGS. 1A and 1B are front views of an example of the apparatus for texture processing the surface of the substrate, FIGS. 2A and 2B are plan views of the essential parts of the apparatus of FIGS. 1A and 1B, FIG. 3 is a front view of a substrate washing means in the apparatus of FIGS. 1A and 1B, and FIG. 4 is a side elevational view of the substrate washing means.

Referring first to FIG. 1A, the substrate processing apparatus includes a substrate supporting tool 1 for rotatably supporting a substrate 2 to be processed, a pair of processing heads H1 and H2, a substrate driving motor 3 for rotating the substrate 2 at a speed which ensures that the substrate 2 is rotated at predetermined speeds relative to first and second polishing tapes employed in the processing heads, a substrate washing means S disposed between the two processing heads for washing the substrate, and a control unit 17 for controlling the two processing heads H1 and H2, the substrate driving motor 3 and the substrate washing means S. The pair of processing heads consists of a first processing head H1 disposed on one side of the substrate supporting tool, and a second processing head H2 disposed on the other side of the substrate supporting tool. The first processing head H1 includes a pair of contact roller units C for concurrently pressing first polishing tapes 4 against the two surfaces of the substrate 2 under a predetermined pressure, a tape winding motor 7a for winding the first polishing tapes 4, a vibration means W for vibrating the contact roller units C in the radial direction of the substrate 2, and a reciprocatively moving means R for moving the contact roller units C back and forth in the radial direction of the substrate 2. The second processing head H2 has the same configuration as that of the first processing head H1 with the exception that it employs second polishing tapes having a smaller grain size.

FIG. 1B is an enlarged view of the essential parts of the apparatus shown in FIG. 1A whose major component is the first processing head H1.

Now, the processing head H1 will be detailed with reference to FIG. 2A which is an enlarged plan view of the essential parts thereof and FIG. 2B which is a plan view of the essential parts thereof (with part being broken). The first processing head H1 includes a pair of parallel plate springs 10 and 11 supported on the reciprocatively moving means R in such a manner as to be movable in the axial direction of the substrate 2. A pressurizing and moving means 23 is provided for moving the parallel plate springs 10 and 11 such that effects of the back tension generated by winding the polishing tapes 4 can be eliminated and such that a predetermined fine pressurizing force can be set. A pressurizing force correcting means 50 (e.g., a piezoelectric actuator) for correcting small variations in the pressurizing force resulting from the accuracy of the configuration of the substrate during the processing of the substrate. Contact rollers 8 and 9 are respectively mounted on the parallel plate springs 10 and 11, the contact rollers 8 and 9 being provided on the two sides of the substrate 2 with their central axes directed in the radial direction of the substrate 2. A polishing tape driving unit 7 is mounted on the reciprocatively moving means R for causing the polishing tapes 4 to slide between the substrate 2 and the contact rollers 8 and 9. Stress measuring means 12 and 13 are respectively mounted on the parallel plate springs 10 and 11, and the control unit 17 is provided for controlling the pressurizing and moving means 23 and the pressurizing force correcting means 50 in accordance with the output of the stress measuring means.

In consequence, in the above-described substrate processing apparatus, small variations in the pressurizing force of the contact roller, which are caused by variations in the back tension occurring during the winding of the polishing tape, i.e., small variations in the pressurizing force, which are caused by variations in the tension of the tape occurring as the diameter of the polishing tape wound around the reels 5 and 6 changes, are measured by the stress measuring means 12, and the parallel plate spring 10 is moved by the pressurizing and moving means 23 in accordance with the obtained variations so as to keep the pressurizing force of the contact roller 8 against the substrate 2 constant regardless of the variations in the tension of the polishing tape. Furthermore, variations in the pressurizing force, caused by the waviness of the substrate in the circumferential direction thereof or by the warpage of the substrate in the radial direction thereof, can be corrected by the pressurizing force correcting means 50 which may be a piezoelectric actuator. With the above-described functions, the micro grooves can be formed on the surface of the substrate with a high degree of accuracy.

The first processing head H1 is disposed on one side of the substrate supporting tool 1 (on the right side as viewed in FIGS. 1A) for conducting the first polishing process on the two surfaces of the substrate 2 and thereby forming micro grooves (having a depth of, for example, about 0.1 μm). The processing head H1 includes tape winding motors 7a and 7b for winding the first polishing tapes 4 mounted on the two contact roller units C disposed on the two sides of the substrate 2 in an upward direction, the vibration means W for vibrating the contact roller units C in the radial direction of the substrate 2, and the reciprocatively moving means R for reciprocatively moving the contact roller units C in the radial direction of the substrate 2. Each of the contact roller units C includes a contact roller 8 for pressing the first polishing tape 4 against the substrate 2, and a pressurizing motor 14 for applying a predetermined pressurizing force to the contact roller 8 through the parallel plate spring 10. The parallel plate spring 10 is provided with the strain gage 12 for detecting the pressurizing force. The pressurizing motor 14 is adapted to apply the pressurizing force by displacing the parallel plate spring 10 in the direction perpendicular to the surface of the substrate 2. The pressurizing force correcting piezoelectric actuator 50 is adapted to correct fine variations in the pressurizing force with excellent response during the processing of the substrate. The vibration means W includes a motor 16, and a crank 55 for connecting the shaft of the motor 16 and the first processing head H1. The reciprocatively moving means R is capable of transmitting the rotation of a motor 15 to the first processing head H1 and thereby moving the processing head back and forth.

The second processing head H2 has the same configuration as that of the first processing head H1 with the exception that it employs the second polishing tapes in place of the first polishing tapes. The second processing head H2 is disposed on the other side of the substrate supporting tool (on the left side as viewed in FIG. 1A) for conducting the second polishing process in which the fine protrusions formed by the first processing head as a consequence of formation of the micro grooves are removed.

The processing head will be described further with reference to FIGS. 1A and 1B. A reference numeral 1 denotes a horizontal rotary shaft on which the substrate is mounted; 2, a substrate to be processed; 3, a driving motor for rotating the rotary shaft 1; 21, a rotatably supported screw; 15, a motor for rotating the screw 21, and 22, a reciprocatively moving base 22 supported in such a manner as to be movable in the radial direction of the substrate, i.e., in the direction indicated by the arrow A. The reciprocatively moving base 22 has a female screw which meshes the screw 21. The screw 21 and the motor 15 in combination form the reciprocatively moving means R. A reference numeral 23 denotes a moving base supported on the reciprocatively moving base 22 in such a manner as to be movable in the direction indicated by the arrow A, and 16, a vibrating unit fixed to the reciprocatively moving base 22 for vibrating the moving base 23 with fine amplitude.

Turning to FIGS. 2A and 2B, a reference numeral 24 denotes a screw rotatably supported on the moving base 23; 14 a pressurizing motor for rotating the screw 24; and 10 and 11, a pair of parallel plate springs supported on the moving base 23 in such a manner as to be movable in the axial direction of the substrate, i.e., in the direction indicated by the arrow B. A supporting base 51 of the parallel plate springs 10 and 11 has a female screw which meshes the screw 24. The screw 24 and the motor 14 in combination form the pressurizing and moving means. There occur variations in the pressurizing force during the processing when there exists on the substrate a waviness in the circumferential direction or a warpage in the radial direction. Hence, the parallel plate springs 10 and 11 are mounted on the supporting base 51 provided with the pressurizing force correcting piezoelectric actuator 50, and the female screw of the supporting base 51 is in engagement with the screw 24, as stated above. Reference numerals 8 and 9 denote contact rollers rotatably mounted on the parallel plate springs 10 and 11, respectively. The contact rollers 8 and 9 are provided on the two sides of the substrate 2 with their axes directed in the radial direction of the substrate 2. Reference numerals 18a and 18b denote braking torque motors mounted on the moving base 23; 5a and 5b, supply reels mounted on the output shafts of the motors 18a and 18b, 7a and 7b, winding motors mounted on the moving base 23; 6a and 6b, winding reels mounted on the output shafts of the motors 7a and 7b, and 4a and 4b, polishing tapes whose two ends are respectively fixed to the supply reels 5a and 5b and the winding reels 6a and 6b. Each of the polishing tapes 4a and 4b is composed of a substrate which may be a polyester film, and fine abrasive grains such as diamond or alumina grains which are held together and adhered to the substrate by means of a binder which may be a resin. The motors 18a and 18b, the supply reels 5a and 5b, the motors 7a and 7b, and the winding reels 6a and 6b in combination form the polishing tape driving unit which causes the polishing tapes 4a and 4b to pass between the substrate 2 and the contact rollers 8 and 9. Reference numerals 12 and 13 denote the strain gages respectively mounted on the parallel plate springs 10 and 11, and a reference numeral 17 denotes the control unit for controlling the motors 3, 14, 15 and so on. The control unit 17 controls the motor 14 for moving the parallel plate springs 10 and 11 and the pressurizing force correcting piezoelectric actuator in accordance with the outputs of the strain gages 12 and 13.

The substrate washing means S shown in FIG. 1A will now be described concretely with reference to FIGS. 3 and 4 which are respectively front and side elevational views of the essential parts thereof.

The substrate washing means includes a rotary scrubber (which may be a brush or a sponge) 61 for concurrently washing the two sides of the substrate, a scrubber driving motor M for rotating the rotary scrubber 61, an air cylinder (not shown) for moving the rotary scrubber 61 between the position 61' indicated by the broken line and that indicated by the solid line, and a liquid tank 65. A reference numeral 60 denotes a supply unit for supplying a processing liquid and a washing liquid.

The operation of the thus-arranged texture processing apparatus will be described below.

First, the substrate 2 is mounted on the substrate supporting tool 1 of the processing apparatus shown in FIG. 1A. Next, the processing conditions, such as the pressurizing force, the relative speed, the vibration amplitude, and the times at which the control rollers are moved back and forth are set on the control unit 17.

Next, the substrate processing apparatus is turned on so as to form micro grooves in the surface of the substrate 2 by means of the polishing tapes 4a and 4b. Once the substrate processing apparatus is on, the motor 3 rotates the substrate 2, and concurrently with this, the vibrating motor 16 vibrates the first processing head H1 with the preset vibration amplitude while the polishing tape driving unit 7 winds the polishing tapes 4a and 4b under a fixed pressure, during which the pressurizing force against the substrate 2 is maintained to the first set pressurizing force. At the same time, the reciprocatively moving means R moves the reciprocatively moving base 22 back and forth. During the operation, the rotational speed of the substrate 2 is adjusted by the substrate driving motor 3 such that the speed of the substrate 2 relative to the first polishing tape 4 is maintained to the preset first relative speed. During the processing, the processing liquid is continuously supplied from the supply unit 60 to the substrate.

Even when the tensions of the polishing tapes 4a and 4b change and the parallel plate springs 10 and 11 are thereby deformed, the control unit 17 controls the motor 14 in accordance with the outputs of the strain gages 12 and 13, i.e., the amount at which the parallel plate springs 10 and 11 are deformed. In consequence, the pressurizing force of the contact rollers 8 and 9 against the substrate 2 can be maintained constant in spite of the variations in the tensions of the polishing tapes 4a and 4b, and the fine pressurizing force can thereby be always maintained constant. Therefore, fine and uniform micro grooves can be found. Furthermore, variations in the pressurizing force caused by the rotation of the substrate 2 and by the sliding of the processing head in the radial direction of the substrate, i.e., variations in the pressurizing force caused by the waviness on the substrate 2 in its circumferential direction and by the warpage of the substrate 2 in its radial direction, can be corrected by the pressurizing force correcting piezoelectric actuator 50 under the control of the control unit 17.

Once the first processing head has been moved back and forth a preset number of times, the processing head H1 retracts (moves rightward as viewed in FIG. 1A), and supply of the processing liquid from the supply unit 60 stops.

Next, the rotary scrubber 61 located at the position 61' indicated by the broken line in FIGS. 3 and 4 is moved up to the position 61 indicated by the solid line, and the rotary scrubber 61 is then rotated by the scrubber driving motor M. The substrate 2 is also rotated, and the washing liquid is supplied from the supply unit 60 to the rotating substrate 2 to wash it. Once the washing operation is completed, the rotary scrubber 61 moves down to the position 61' indicated by the broken line, and supply of the washing liquid stops.

Thereafter, the second processing head H2, disposed on the opposite side of the substrate supporting tool 1 to the first processing head H1, as shown in FIG. 1A, advances so as to conduct on the substrate 2 the second polishing process in which the substrate 2 is processed by means of the second processing head. During the second polishing process, the substrate is rotated by the motor 3, and concurrently with this, the second processing head H2 is vibrated at the preset vibration amplitude by the vibration motor 16 while the polishing tapes 62a and 62b are wound under a predetermined pressure by the polishing tape driving unit 7. During the winding of the tapes, the pressurizing force applied to the substrate is maintained to the preset second pressurizing force. At the same, the reciprocatively moving base 63 is moved back and forth by means of the reciprocatively moving means. Then, the fine protrusions preset on the surface of the substrates 2 are removed and made flat by the the polishing tape 62a, 62b. During the operation, the rotational speed of the substrate 2 is adjusted by the substrate driving motor 3 such that the speed of the substrate 2 relative to the second polishing tape is maintained to the preset second relative speed. During the processing, the processing liquid is continuously supplied from the supply unit 60 to the substrate. Once the second processing head H2 has moved back and forth preset times, the processing head retracts (moved to the left as viewed in FIGS. 1A and 1B), and supply of processing liquid is stopped. Finally, the substrate 2 is washed by the substrate washing means S in the same manner as that of the proceding washing process, and the substrate processing apparatus is then turned off.

Thereafter, the substrate 2 in the surface of which desired micro grooves are formed is removed from the substrate supporting tool 1. A magnetic disk exhibiting the excellent sliding characteristics is provided by forming a magnetic medium, a protective film and a lubricating film in sequence on such a substrate.

An example of polishing a substrate by means of the aforementioned substrate processing apparatus will be explained below with reference to FIGS. 5 and 6. The substrate 2 employed in this example was an A1 alloy substrate whose surface was Ni-P plated to a thickness of about 10 $\mu$m and has micro grooves formed therein.

FIG. 5 shows an example of an enlarged cross-sectional curve of the surface of the substrate which is processed by the first processing head H1 (which is subjected to the first polishing process) of the substrate processing apparatus shown in FIG. 1, and FIG. 6 shows an example of an enlarged cross-sectional curve of the surface of the substrate which is further processed by the second processing head H2 (which is subjected to the second polishing process).

The substrate 2 was processed by the first processing head H1 while the water-soluble cutting liquid was being supplied to the substrate 2. The $Al_2O_3$ abrasive grains of the first polishing tape 4 had a grain size of 4 $\mu$m, and the first pressurizing force applied during this process was 10N. The first relative speed was 4 m/sec, and the vibration amplitude was 1 mm. The processed surface of the substrate had micro grooves having a depth V of about 100 nm and fine protrusions having a height H of about 30 nm, as shown in FIG. 5. The height of the protrusions varied a lot. The surface had a roughness Ra of 6 to 7 nm and showed a cross-sectional curve whose symmetry Rsk was −0.3 and a three-dimensional bearing curve in which the sectional area ratio at the section taken at a depth of 5 nm from the top portion of the surface was 0.1% or less.

After the above-described first polishing process was completed, the second polishing process was performed. That is, the surface of the substrate 2, which was washed by the pure water, was processed by the second processing head H2 while the water-soluble cutting liquid was being supplied to the substrate 2. The $Al_2O_3$ abrasive grains of the second polishing tape had a grain size of 1 $\mu$m, and the second pressurizing force applied during this process was 4N. The second relative speed was 8 m/sec, and the vibration amplitude was 1 mm. The depth V of the micro grooves formed in the surface of the substrate 2 was maintained to about 100 nm, and the height H of the protrusions was reduced to about 10 nm or less, as shown in FIG. 6. The height of the protrusions varied less. The surface had a roughness Ra of 6 to 7 nm and showed a cross-sectional curve whose symmetry Rsk was −1.5 and a three-dimensional bearing curve in which the sectional area ratio at the section taken at a depth of 5 nm from the top portion of the surface was 0.8% or less.

As stated above, since the protrusions formed at the shoulders of the micro grooves can be reduced by the second processing head, it is possible to provide a smooth surface in which the micro grooves have a depth V ranging from 20 nm to 100 nm and the protrusions have a reduced height H. Furthermore, arbitrary micro grooves can be formed by changing the processing conditions, such as the grain size or the material of the abrasive grains of the polishing tapes, the times at which the contact rollers are moved back and forth along the substrate, and the pressurizing force.

A thin film magnetic disk 80 can be formed by forming on the thus-obtained substrate 30 a non-magnetic metal film 31, a magnetic medium film 32, a carbon protective film 33 and a lubricating film 34 in sequence, as shown in FIG. 9. The resultant magnetic disk 80 has excellent heat floating characteristics, and is reliable and stable.

Now, the various characteristics of the thin film magnetic disk with micro grooves according to the present invention, together with those of the comparison example, will be described in detail.

That is, the magnetic disk according to the present invention has a substrate having a surface configuration in which the height of the fine protrusions is between several nm and several tens of nm, whose surface roughness Ra is between several nm and several tens of nm, in which the symmetry Rsk of the sectional curve thereof is negative, preferably, −0.7 or less, and more preferably, −1 or less and which shows a three-dimensional bearing curve in which the sectional area ratio at the section corresponding to the portion of the fine protrusions which is deformed by the head load during the CSS drive, i.e., at the section taken at a depth of 5 to 10 nm from the top portion, is between 0.1% and 10%. The magnetic disk exhibiting such characteristics will be compared below with a magnetic disk having a substrate other than that of the magnetic disk according to the present invention.

Figure 25:
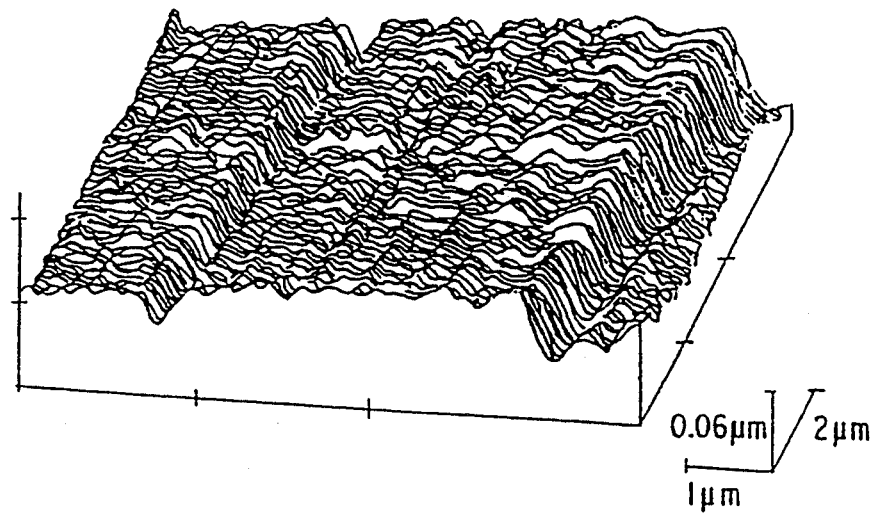
FIG. 25 three-dimensionally shows a texture processed surface of a magnetic disk according to the present invention.
Figure 26:
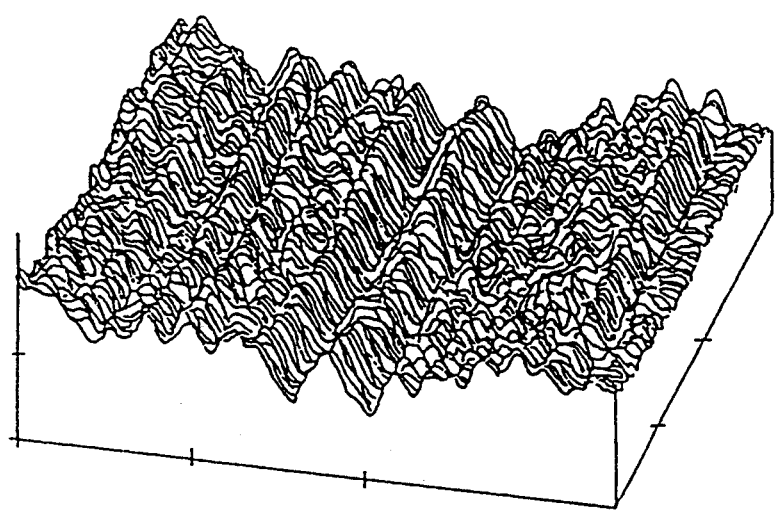
FIG. 26 three-dimensionally shows a conventional texture processed surface.

FIG. 25 shows the results obtained by three-dimensionally measuring the texture processed surface according to the present invention, and FIG. 26 shows the results obtained by measuring the conventional texture processed surface in the same manner.

As is clear from the two illustrations, the surface shown in FIG. 25 is very smooth.

Substrates having different surface configurations were manufactured by conducting texture process under different conditions, including the grain size of the polishing tape, the times at which the processing head is moved back and forth, the pressurizing force and so on. The different surface configurations had fine protrusions of different heights and showed different surface properties. Thereafter, thin film magnetic disks were manufactured by forming the aforementioned non-magnetic metal film, the magnetic medium film, the carbon protective film and the lubricating film on the thus-obtained substrates. FIGS. 13, 14 and 19 respectively show the relation between the head floating characteristics and the head adhesion and the height of the fine protrusions, the relation between the head floating characteristics and the head adhesion and the symmetry, and the relation between the times at which the CSS was driven and the amount at which the fine protrusions are deformed, i.e., the head-friction. As shown in FIG. 13, when the height of the fine protrusions was several nm (2 to 3 nm) or less, the substrate exhibited excellent head floating characteristics. However, the head-stickiness increased, and head adhesion, damage to the head supporting gimbal, overloads to the substrate rotating motor, and cessation of rotation of the substrate occurred. When the height of the fine protrusions was several tens of nm or above, e.g., in a case where the fine protrusions were 90 nm or above in height, the head-stickiness was small, and no head adhesion occurred. However, the head floating characteristics deteriorated, and head crashing occurred. When the height of the fine protrusions was between 3 and 10 nm, the head floated stably at a height of 0.15 μm, and the head-stickiness was small. Therefore, the reliable floating characteristic was obtained.

As shown in FIG. 14, the characteristics of the substrate improved when the symmetry Rsk was negative, preferably, −0.7 or less, and more preferably, practically used between −1 and −2.

The relation between the three-dimensional bearing ratio and the head floating characteristics and the head adhesion (represented by the friction of the head) is as per description taken in connection with FIG. 32.

The conventional texture processed surface shown in FIG. 26 had a surface roughness Ra of 6 nm, and exhibited a three-dimensional bearing curve in which the sectional area ratio at the section taken at a depth which was 5 nm from the top of the surface was 0.08%. The pressure of the head load received by the respective fine protrusions was large. As shown by the curve D in FIG. 19, as the start-stop-cycles increased, wear of the fine protrusions caused by the sliding of the head advanced, and damage to the lubricating film and carbon protective film proceeded. Furthermore, as the start-stop-cycles increased, the head-friction increased, and head crashing occurred. The texture processed surface according to the present invention, shown in FIG. 25, had a surface roughness Ra of 6 nm, and showed a three-dimensional bearing curve in which the sectional area ratio at the section taken at a depth which was 5 nm from the top portion was between 0.1 and 10%. In this case, as shown by the curve C in FIG. 19, even when the start-stop-cycles was conducted 30000 times, there was substantially no increase in the head-friction and no damage to the lubricating film and the carbon protective film. In the case of the surface which had a roughness Ra of 6 nm and which exhibited a three-dimensional bearing curve in which the sectional area ratio at the section taken at a depth which was 5 nm was 15%, the area of the disk surface with which it made contact with the magnetic head was large, and the head-stickiness at the initial stage of the CSS drive was thus large. Hence, the head supporting gimbal was damaged during the rotation of the disk, and cessation of rotation of the substrate occurred due to the application of overload to the substrate rotating motor.

The above-described embodiment employed the polishing tape to form the micro grooves and fine protrusions on the substrate. However, a surface processing technique, such as cutting, grinding, lapping or polishing, a surface processing technique such as etching or sand blasting, a dry pattern forming technique, or a combination of any of these techniques, may also be performed.

In the above-described embodiment, the polishing tape had a width smaller than that of the surface of the substrate which is to be processed, and the contact roller for pressing such a polishing tape was moved back and forth and at the time vibrated in the radial direction of the substrate to process the surface of the substrate. However, a polishing tape having a width close to or larger than that of the surface to be processed may also be employed. At that time, the contact roller for pressing such a polishing tape may or may not be vibrated to process the substrate.

In addition to the Ni-P plated substrate, the above-described texture process may also be performed on an Al substrate, a non-magnetic film or a protective film.

As will be understood from the foregoing description, according to the present embodiment of the substrate processing method and the apparatus suitable for use in this method, it is possible to provide a magnetic disk which exhibits excellent CSS characteristics even when the height at which the head floats up is, for example, 0.1 $\mu$m. More specifically, it is possible to form a magnetic disk substrate having a surface configuration in which the height of the fine protrusions is between several nm and several tens of nm, in which the surface roughness Ra is between several nm to several tens of nm, in which the symmetry Rsk of the sectional curve thereof is $-0.7$ or less, and which shows a three-dimensional bearing curve in which the sectional area ratio at the section corresponding to the portion of the fine protrusions which is deformed by the head load during the CSS drive, i.e., at the section taken at a depth which is 5 to 10 nm from the top portion, is between 0.1% and 10%. In consequence, during the CSS drive in which the magnetic head intermittently makes contact with the surface of the disk, the head load is received by the large number of fine protrusions, and the pressure received by each of the respective fine protrusions is thereby reduced, reducing deformation or wear of the fine protrusions. Furthermore, deterioration in the protective film and the lubricating film formed on the fine protrusions is reduced, and the debris caused by the sliding of the magnetic head escapes into the deep micro grooves.

Furthermore, in the substrate processing apparatus, since the pressurizing force of the contact rollers against the substrate can be maintained constant by means of the parallel plate springs, the strain gages and the pressurizing force correcting piezoelectric actuator regardless of the configuration accuracy of the substrate, micro grooves can be formed uniformly and stably over the entire surface of the substrate. Furthermore, since the fine protrusions formed on the Ni-P plated substrate can be removed slightly, the fine protrusions can be made smooth with a high degree of accuracy.

In addition to the formation of the micro grooves on the surface of the substrate, the abovedescribed substrate processing apparatus is also capable of removing a very small amount of fine protrusions formed in the protective film, e.g., a carbon protective film, formed on the surface of the magnetic disk without damaging the portion of the carbon protective film or that of the magnetic medium located around the fine protrusions. In consequence, it is possible to provide a very accurate and smooth surface.

Thus, the present invention provides a highly reliable magnetic disk and a magnetic disk unit which exhibit excellent CSS characteristics even when the height at which the head floats up is low and which allow head crashing to be eliminated. Provision of the highly reliable disk and the head and disk assembly can be made possible by providing a magnetic disk manufacturing method in which the processed surface is estimated using the sectional area ratio on the three-dimensional bearing curve thereof and a processing apparatus which includes the first and second processing heads and the washing means used to carry out the first and second polishing processes in the above-described manufacturing method.

Next, another embodiment of the present invention will be described below.

Figure 33:
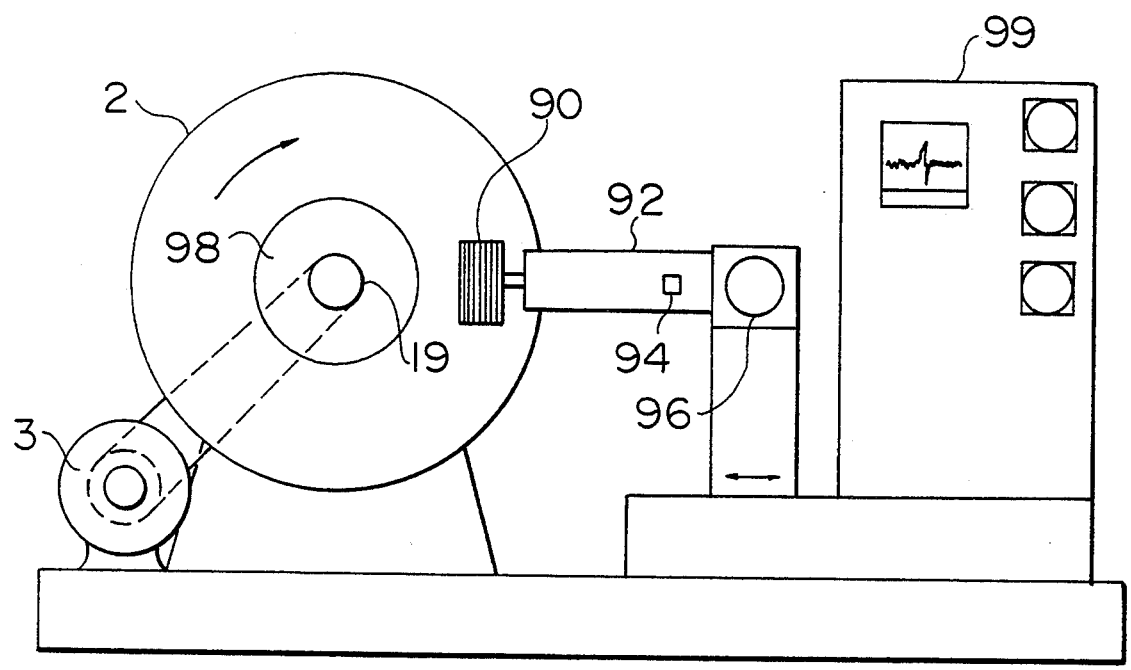
FIG. 33 is a front view of a substrate processing device used to conduct a first process of another embodiment of the present invention.
Figure 34A:
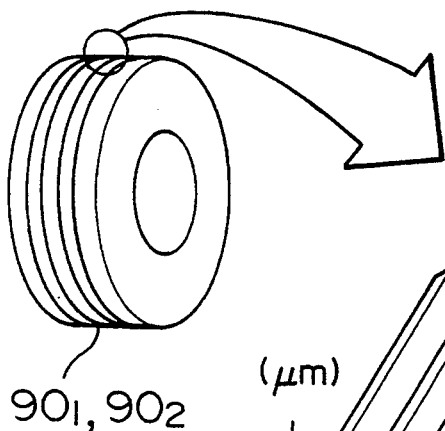
FIGS. 34A and 34B respectively are a general perspective view and a partially enlarged view of the form of a plastic working tool according to the present invention employed in the processing device of FIG. 33.
Figure 34B:
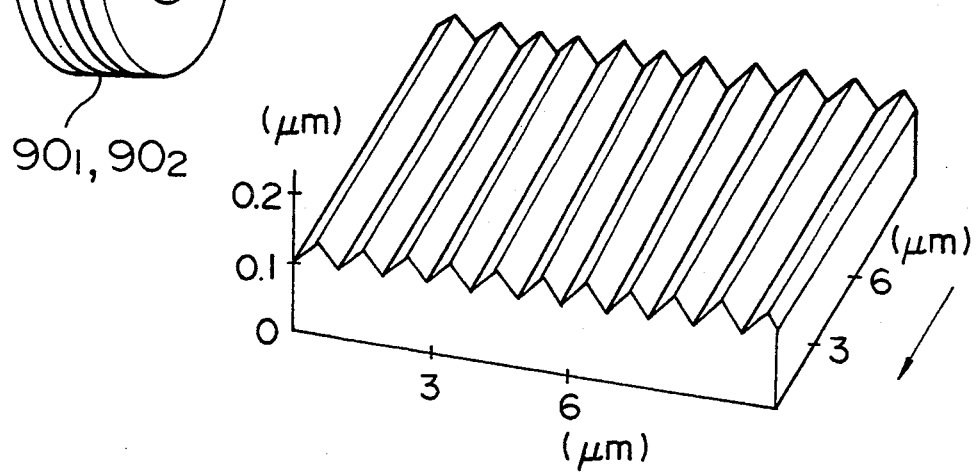

Referring first to FIG. 33 which shows a magnetic disk substrate processing apparatus employed in the first process of the magnetic disk manufacturing method according to the present invention, the magnetic disk substrate 2 is held by a retaining tool 98, and is rotated by the motor 3. A plastic working tool 90 is rotatably supported along the radial direction of the disk substrate 2. The plastic working tool 90 has micro grooves formed on its circumferential surface, as shown in FIG. 34A and 34B. The plastic working tool 90 is supported by a parallel plate spring 92, on which a strain gage 94 is adhered. The output of the strain gage 94 is detected by an operation control unit 99 so that a piezoelectric actuator 96 is operated on the basis thereof so as to apply a constant pressurizing force to the parallel plate spring 92. Actually, the plastic working tool 90 is provided at each side of the rotating magnetic disk substrate 2, as shown by reference numerals $90_1$ and $90_2$ in FIG. 35. The plastic working tools 90 are pressed against the two surfaces of the magnetic disk substrate 2 under a low, constant pressure so that the fine irregularities on the surfaces of the plastic working tools 90 can be transferred onto the two surfaces of magnetic disk substrate 2 at the same time by means of the plastic deformation.

Figure 12:
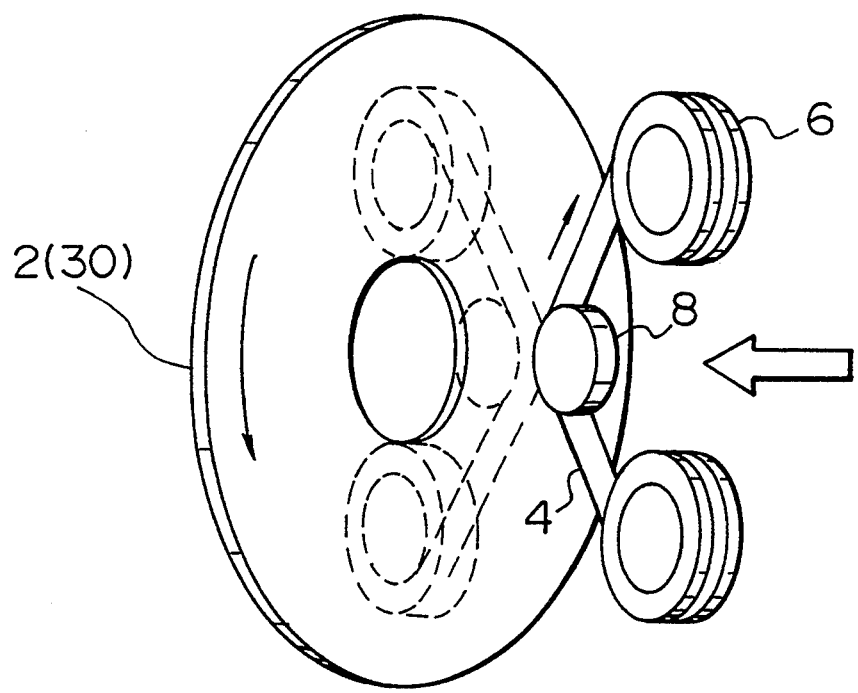
FIG. 12 illustrates a conventional substrate processing apparatus.
Figure 36:
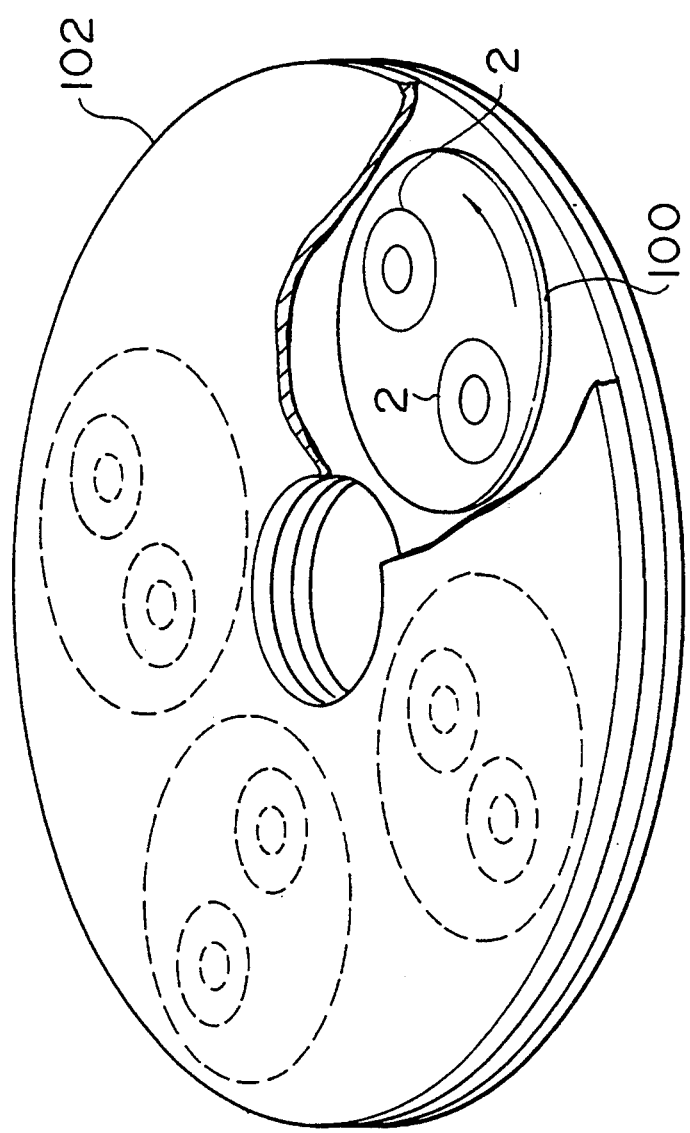
FIG. 36 is a perspective view, with parts broken away, of a two surface polishing device which is used in conducting a second process of another embodiment of the present invention.
Figure 37:
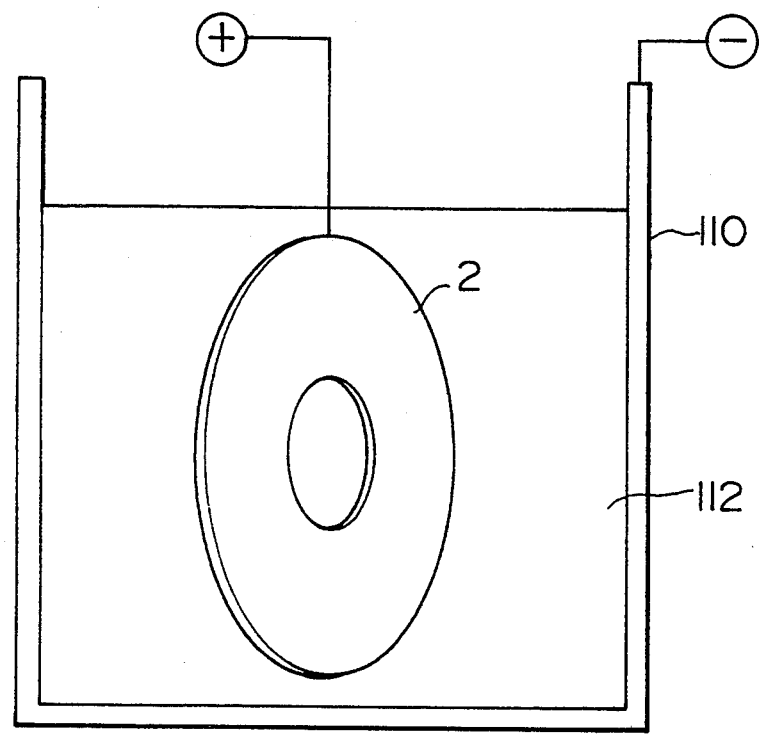
FIG. 37 is a schematic view of the electro polishing method used to conduct the second process of another embodiment of the present invention.

Next, the second process will be described with reference to FIGS. 36, 37 and 12. FIG. 36 shows the process of polishing the two surface simultaneously, and FIG. 37 shows the electro polishing process of selectively polishing the fine protrusions. FIG. 12 shows the known polishing process employing the polishing tapes 4.

In the process of simultaneously polishing the two surface shown in FIG. 36, only the fine protrusions formed in the surface of the magnetic disk substrate 2 are polished by placing the magnetic disk substrates 2 held on a carrier 100 between upper and lower plates 102 on each of which a polishing pad is adhered and then by moving them relative to the plates 102 while abrasive grains of, for example, aluminum oxide having an average grain size of 0.3 $\mu$m are supplied thereto.

In the electro polishing process shown in FIG. 37, the fine protrusions in the surface of the magnetic disk substrate 2 are selectively polished by immersing the magnetic disk substrate 2 in a mixture liquid 112 contained in an electrolytic bath 110 and then by conducting currents between the magnetic disk substrate 2 and the electrolytic bath 110. The mixture liquid may be a mixture of, for example, sulphuric acid, phosphoric acid and citric acid.

The tape polishing process shown in FIG. 12 employs a polishing tape 4 which is composed of a film made of, for example, a polyester, and abrasive grains fixed to the surface of the film. The abrasive grains may be aluminum oxide grains having an average grain size of 0.3 $\mu$m. The fine protrusions in the surface of the magnetic disk substrate 2 are polished by winding the polishing tape 4 pressed against the surface of the rotating disk substrate by means of the elastic contact roller 8 and at the same time by moving the tape back and forth in the radial direction of the substrate.

Now, the results of the experiments in which the magnetic disk substrate 2 was processed by the method according to the present invention will be described.

EXAMPLE 1

Figure 38:
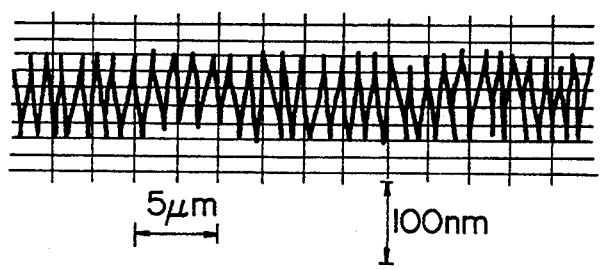
FIG. 38 shows the measured sectional form of a recording surface of a magnetic disk substrate which is subjected to the first process shown in FIG. 33.

FIG. 38 shows the results of the experiment obtained by processing the Ni-P plated layer 31 formed to a thickness of 10 $\mu$m on the aluminum disk 30 having a surface roughness Ra of 2 to 3 nm, an outer diameter of 130 mm and an inner diameter of 40 mm, as shown in FIG. 9, under a pressurizing force of 5N, at a feeding speed of 2 mm/min and at a magnetic disk substrate rotation speed of 50 rpm using the plastic working tool 90 made of a sintered hard alloy. The surface of the plastic working tool 90 with which the magnetic disk substrate 2 made contact was spherical and had cuts shown in FIGS. 34A and 34B. The results shown in FIG. 38 correspond to those obtained by measuring the surface of the disk which is subjected to the first process explained in connection with FIGS. 33 to 35. As is clear from FIG. 38, the surface of the magnetic disk substrate 2 has uniform grooves and protrusions of about 100 nm formed at a pitch of about 1 $\mu$m in its circumferential direction. It is also clear that the grooves and protrusions formed on the surface of the substrate shown in FIG. 38 are farther uniform than those formed on the surface subjected to the conventional first process, shown in FIG. 43. Whereas head crashing occurs on the conventional magnetic disk whose surface has a cross-section shown in FIG. 43, damaging both the magnetic disk and head, damage to the magnetic disk according to the present invention having a sectional force shown in FIG. 38 is far less.

Figure 39:
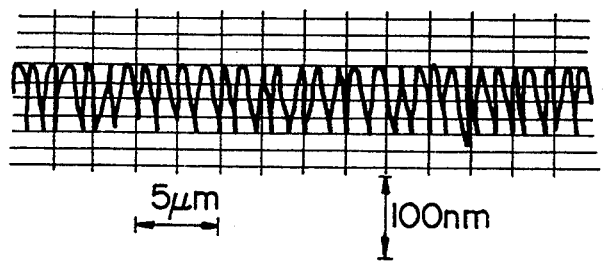
FIG. 39 shows the measured sectional form of a recording surface of a magnetic disk substrate which is subjected to the second process employing the two surface polishing device of FIG. 34.

FIG. 39 shows the results of the experiment obtained by conducting the second process explained in connection with FIG. 36 on the surface of the magnetic disk substrate 2 having the section shown in FIG. 38. Compared with FIG. 38, it is clear that the height of the protrusions on the surface of the disk 2 are uniform. Abrasive grains employed had an average grain diameter of 0.3 $\mu$m. A magnetic disk whose surface has a cross-sectional form shown in FIG. 38 is practical enough. However, an excellent practical performance is obtained from the second process subjected to the magnetic disk.

Figure 40:
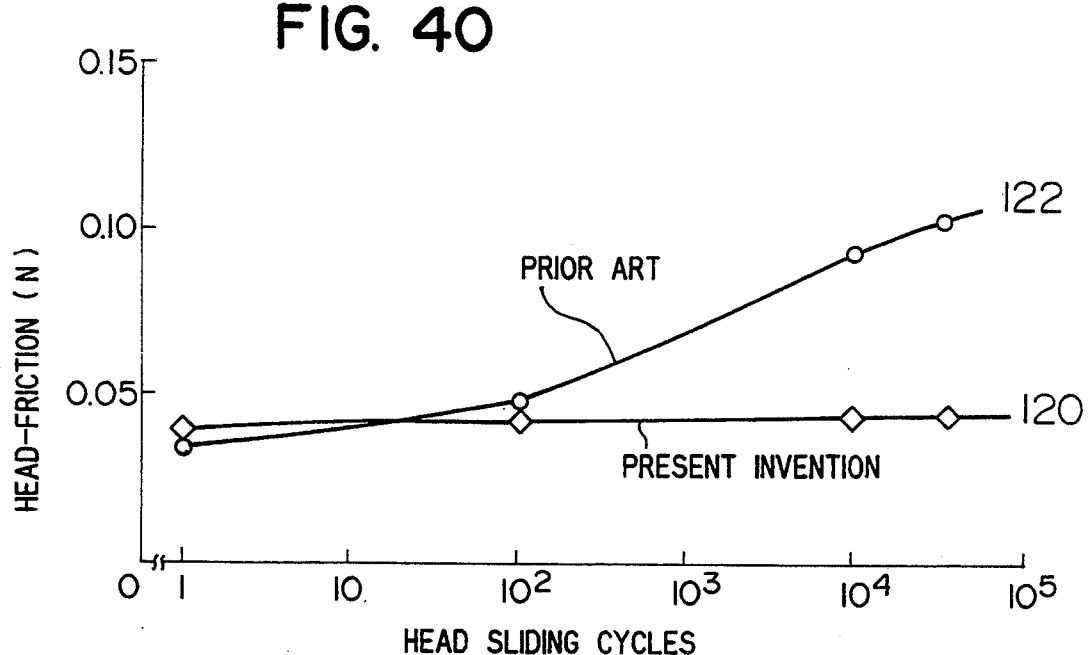
FIG. 40 shows the results of the magnetic head sliding tests conducted on a magnetic disk according to the present invention and on a conventional magnetic disk as compared.

A magnetic disk was formed by forming on the magnetic disk substrate which has been subjected to the above-described first and second processes the non-magnetic metal film 31 such as Cr to a thickness of about 300 $\mu$m, the Co-Ni type magnetic medium 32 film to a thickness of about 50 $\mu$m and the carbon protective film 34 and the lubricating film respectively to a thickness of about 50 $\mu$m in sequence, as shown in FIG. 9. A curve 120 in FIG. 40 shows the results of the CSS test conducted on such a magnetic disk. In the CSS test, the magnetic head is brought into contact with the magnetic disk, and the magnetic disk is rotated intermittently in that state. As is clear from the curve 120 in FIG. 40, there was no increase in the head-friction of the magnetic disk according to the present invention, which was initially 0.04N, after the CSS test was conducted over 10,000 times. Furthermore, the magnetic head floated up above the surface of the magnetic disk stably at a height of 0.1 $\mu$m.

In contrast, the friction characteristic of the conventional disk increased after the start-stop-cycles exceeded about 100 times, as is shown by a curve 122 in FIG. 40. This increase in the head-friction increases occurrence of head crashing.

EXAMPLE 2

Figure 41:
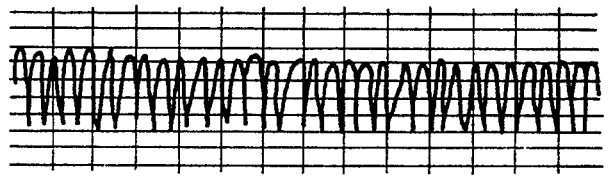
FIG. 41 shows the measured sectional form of a recording surface of a magnetic disk substrate which is subjected to the second process shown in FIG. 37.

FIG. 41 shows the results obtained by measuring the surface roughness of the disk which was subjected to the first process and then the second electro polishing process shown in FIG. 37. A mixture liquid containing 54 wt % of sulphuric acid, 45 wt % of phosphoric acid and 1 wt % of citric acid was used as the electrolyte. Currents having a density of 4.5 A/cm$^2$ was conducted to the electrolyte having a temperature of 30° C. for 1 minute. As is clear from FIG. 41, the protrusions were selectively polished and were made uniform. A magnetic disk was manufactured by conducting the surface process shown in FIG. 9 on the thus-obtained substrate. When the CSS test was conducted on the obtained magnetic disk, the same result as that shown by the characteristic curve 120 in FIG. 38 was obtained.

EXAMPLE 3

The tape polishing process shown in FIG. 12 was conducted as the second process on the disk on which the first process was conducted. The surface roughness of the obtained disk was almost the same as that shown in FIG. 39. Therefore, the same result as that shown by the curve 120 in FIG. 40 was obtained when the CSS test was conducted on the disk. A polishing tape, which was a polyester film to which aluminum oxide powders having a grain size of 0.5 $\mu$m were fixed, was employed.

EXAMPLE 4

Figure 42:
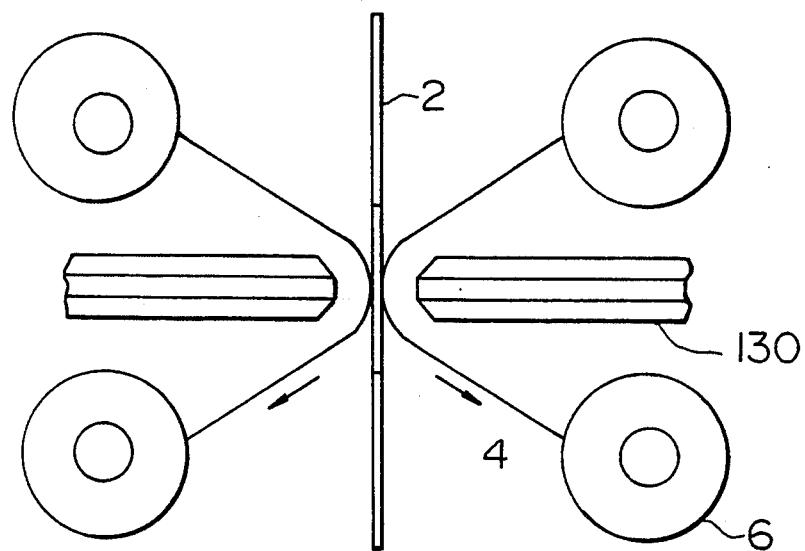
FIG. 42 is a schematic view of another example of a polishing tape polishing device employed to conduct the second process according to the present invention.

The second process was conducted on the surface of the disk 2 which was subjected to the first process by winding the polishing tapes 4 pressed against the surfaces of the disk 2 by means of the air stream blown from nozzles 130 as shown in FIG. 42 and at the same time by moving the tapes 4 back and forth in the radial direction of the disk 2 as the tapes 4 are wound. The surface roughness of the obtained disk was similar to that shown in FIG. 39. Therefore, the same result as that shown by curve 120 in FIG. 40 was obtained when the CSS test was conducted. A polishing tape, which was a polyester film to which aluminum oxide powders having a grain size of 0.5 $\mu$m were fixed, was employed.

The method of processing the single magnetic disk has been described. It is also possible to mass produce duplicates of the magnetic disk obtained by the above-described processing method according to the present invention.

Figure 44:
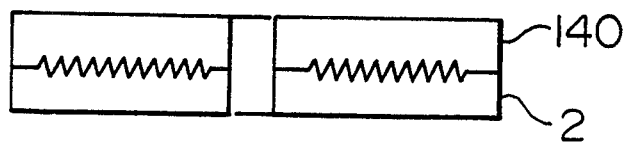
FIG. 44 shows a method of manufacturing a copying mold from the magnetic disk substrates obtained in the second embodiment of the present invention.

A mold 140 of the recording surface of the magnetic disk 2 which is subjected to the first process or both the first and second processes, as shown in FIG. 44, may be formed by coating nickel or the like on the recording surface by means of the electroplating, and the form of the recording surface on the mold or on a harder mold manufactured from the thus-obtained mold may be transferred onto plastic magnetic disk patterns so as to manufacture magnetic disks. Alternatively, the form of the recording surface of the mold 140 may be transferred onto the surface of the aluminum magnetic disk patterns coated with a plastic by means of the thermal plastic working or the like so as to manufacture magnetic disks.

Figure 43:
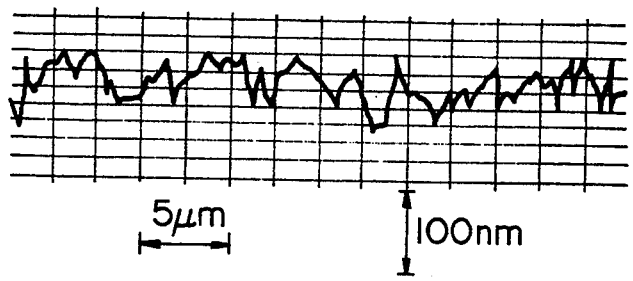
FIG. 43 shows the measured sectional form of a recording surface of a magnetic disk substrate which is subjected to the conventional first process.

The duplicating method shown in FIG. 43 is very difficult to apply to the conventional magnetic disk having a cross-sectional form shown in FIG. 43 for the following reasons: Firstly, the sectional form shown in FIG. 43 has so deep cuts or overhangs (the protrusions which overhang the pits) that they may be partially removed when the duplicates are separated from the mold. Secondary, a high accuracy is required for the mold employed for the mass production, and it is impossible to judge the accuracy of the mold onto the sectional form shown in FIG. 43. The above-described duplicating method can therefore be applied only to the case in which the plastic magnetic disk patterns are manufactured using a tool with which the surface configuration can be formed with a high degree of accuracy, as in the case of the present invention.

Furthermore, it is not always necessary for the duplicating method to employ the plastic working tool such as that shown in FIG. 34A, 34B. Normal precision machine tools or machines used for manufacturing diffraction gratings may also be employed. This is because the present invention is directed to provision of the recording surface of a magnetic disk on which uniform and accurate irregularities are formed, as shown in FIGS. 38 and 39.

As will be understood from the foregoing description, in the present invention, the rough irregularities formed on the surface of the disk during the first process in the conventional processing method can be changed into the fine and uniform irregularities. Furthermore, lapping of the protrusions can be conducted in the second process effectively. In consequence, even when the times at which the contact start-stops test was conducted on the magnetic head and the magnetic disk exceeded 10,000, the surface pressure of the magnetic head was low, and the magnetic head floated up stably. It is thus possible to greatly prolong the life of and improve the reliability of a magnetic disk unit.

Furthermore, since the pitch or the depth of the irregularities on the surface of the magnetic disk can be freely set by using an arbitrary processing tool, the present invention can be applied to magnetic disks having various form and applications.

Furthermore, even when the height at which the magnetic head floats up is 0.1 $\mu$m, the magnetic head does not make contact with the disk, and the stable floating characteristics are assured. In consequence, the recording and reproduction sensitivity of a magnetic disk unit can be improved, and the recording density of the magnetic disk can thereby be increased.

Another embodiment of the present invention will be described below.

Figure 45A:
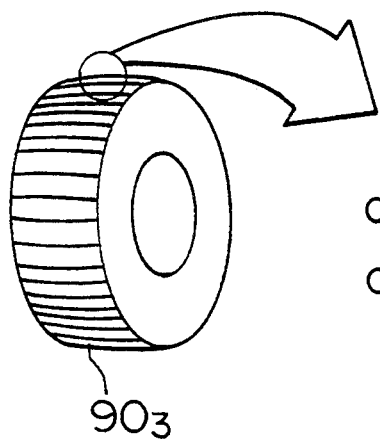
FIGS. 45A to 46B are respectively perspective and enlarged views of a processing tool employed in another embodiments of the magnetic disk manufacturing method according to the present invention.
Figure 45B:
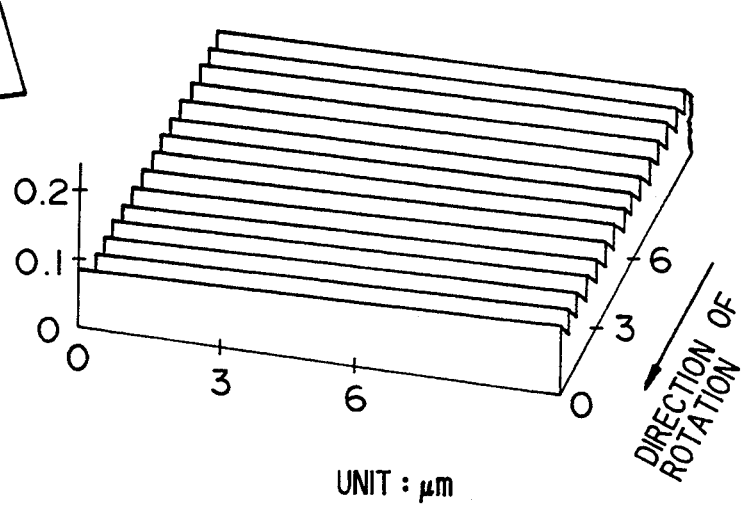

FIGS. 34A and 45B show different processing tools that can be employed in the processing apparatus shown in FIG. 33. The processing tool shown in FIGS. 34A and 34B will also be described below.

The cylindrical processing tool 90 is rotatably supported on a shaft whose axis is directed in the radial direction of the disk which is to be processed. The processing tool 90 is pressed against each of the two surfaces of the disk 2. The cylindrical surface of the processing tool 90 shown by the reference numerals $90_1$, $90_2$, $90_3$ and $90_4$ in FIGS. 34A, 45A and 46A has fine regular grooves and protrusions. The surface of the processing tool 90 is coated with diamond.

The operation control unit 99 shown in FIG. 33 compares the output of the calculation with a preset pressurizing force, and operates the piezoelectric actuator 96 and thereby drives the parallel plate spring 92 in the axial direction of the disk 2 such that the pressurizing force of the processing tool 90 can be maintained constant.

When the disk 2 is to be processed by means of the thus-arranged processing apparatus, the processing tool 90 is pressed against the rotating disk 2 under the set under while it is moved back and forth in the radial direction of the disk 2, by means of which the fine regular grooves and protrusions on the surface of the processing tool 90 are transferred onto the surface of the disk 2.

Next, the examples of processing the surface of the disk using the apparatus shown in FIGS. 33 and 35 and the processing tool 90 having various forms will be described.

EXAMPLE 1

Figure 49A:
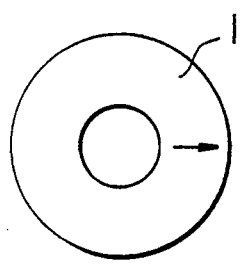
Figure 49B:
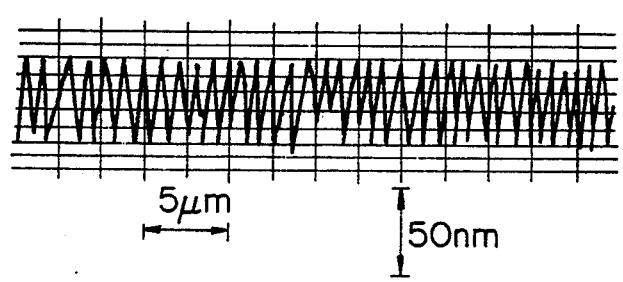

A Ni-P plated aluminum disk, which had an outer diameter of 130 mm, an inner diameter of 40 mm, and a thickness of 2 mm, and which was polished to a surface roughness Ra of 2 to 3 nm, was processed under a pressurizing force of 5N, at a disk rotational speed of 50 rpm and at a processing tool feed speed of 2 mm/min using the processing tools $90_1$ and $90_2$ each of which was a sintered hard alloy and with diamond coated thereon. The sintered hard alloy had an outer diameter of 30 mm and a width of 10 mm, and the surface thereof with which the disk makes contact was spherical. The surface of the sintered hard alloy had cuts shown in FIGS. 34A and 34B. FIGS. 49A and 49B show the results obtained by measuring the processed surface. Micro grooves and protrusions were transferred in the circumferential direction of the disk, and the section taken in the radial direction of the disk (in the direction indicated by the arrow in FIG. 49A) had a form shown in FIG. 49B in which the maximum height was between 40 and 50 nm and in which the grooves and protrusions were formed at a pitch of about 1 $\mu$m.

EXAMPLE 2

Figure 50A:
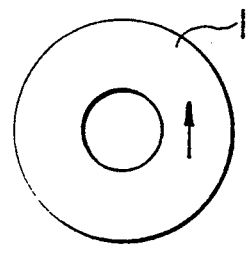
Figure 50B:
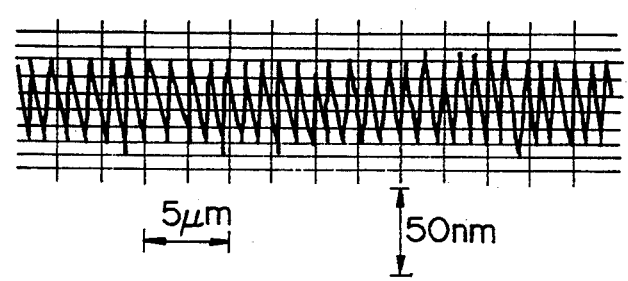

The aluminum disk was processed under the same conditions as those of Example 1 using the processing tool $90_3$ which was the same sintered hard alloy as that employed in Example 1 with the diamond coated thereon. The surface of the sintered hard alloy had regular cuts which extended in the direction perpendicular to the direction in which the processing tool was rotated, as shown in FIGS. 45A and 45B. FIGS. 50A and 50B show the results obtained by measuring the processed surface. Micro grooves and protrusions were transferred radially in the radial direction of the disk, and the section taken in the circumferential direction of the disk (in the direction indicated by the arrow in FIG. 50A) had a form shown in FIG. 50B in which the maximum height of the protrusions was between 40 and 50 nm and in which the grooves and protrusions were formed at a pitch of about 1 $\mu$m.

EXAMPLE 3

Figure 46A:
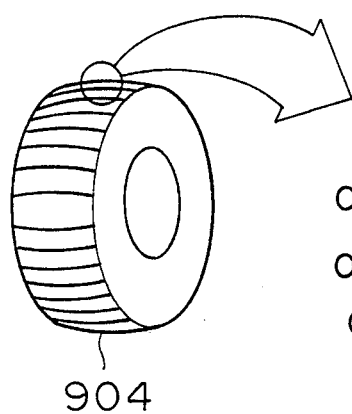
Figure 46B:
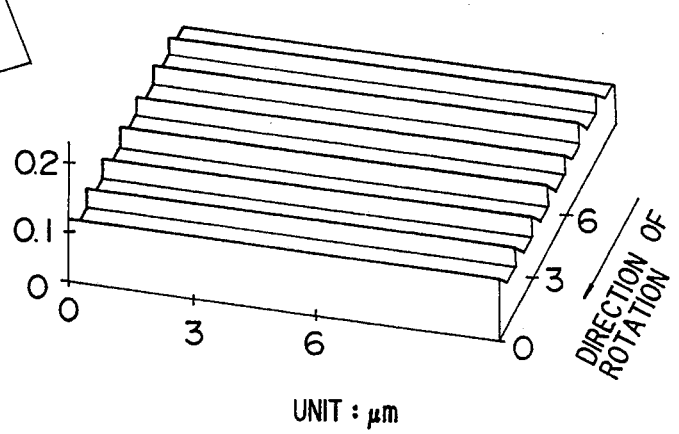

The aluminum disk was processed under the same conditions as those of Example 1 using the processing tool 90₄ which was the same sintered hard alloy as that employed in Example 1 with the diamond coated thereon. The surface of the sintered hard alloy had regular grooves and protrusions which extended in a direction perpendicular to the direction in which the processing tool was rotated, as shown in FIGS. 46A and 46B. The pitch of the protrusions was large. The bottom of the grooves was flat. FIGS. 51A and 51B show the results obtained by measuring the processed surface. Micro grooves and protrusions were transferred radially in the radial direction of the disk, and the section taken in the circumferential direction of the disk (in the direction indicated by the arrow in FIG. 51A) had a form shown in FIG. 51B in which the surface layer of the disk was flat and in which the grooves were formed at a pitch of about 2 μm.

COMPARISON EXAMPLE

Figure 55A:
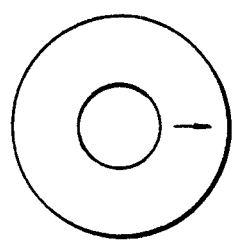
FIG. 55A and 55B shows the direction in which a disk is processed in the conventional disk manufacturing method and the sectional form of the disk.
Figure 55B:
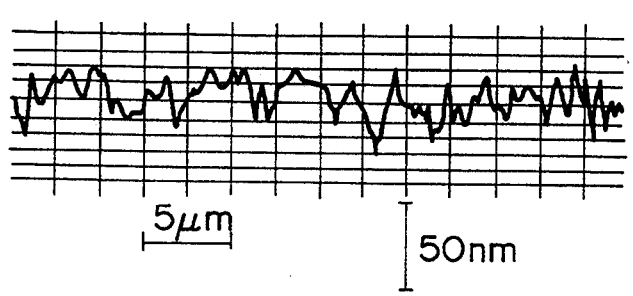

FIGS. 55A and 55B show the results obtained by measuring the surface of the disk which was subjected to the conventional polishing process (disclosed in Japanese Patent Unexamined No. 54-23294). The section taken along the radial direction of the disk (in the direction indicated by the arrow in FIG. 55A) had a form shown in FIG. 55B. Grooves and protrusions having a maximum height of about 50 nm were formed at an irregular pitch.

The present inventors examined the floating characteristics of the disks processed by the disk manufacturing method according to the present invention and those of the disks processed by the conventional disk manufacturing method, and found that the surface of the disk processed by the disk manufacturing method according to the present invention showed small variations in the form and had reduced fine protrusions, and that the disk processed by the disk manufacturing method according to the present invention thus exhibited greatly improved head floating characteristics. In particular, in the case of the disk obtained in Example 2, stable air stream was generated between the magnetic head and the disk during the rotation of the disk, and the magnetic head easily floated up due to the dynamic pressure effects. Furthermore, vibrations of the floating magnetic head were reduced, and the output noises were thus greatly reduced.

On the other hand, the surface of the disk processed by the conventional disk manufacturing method had irregular grooves and protrusions. The presence of the fine protrusions of burrs deteriorated the head floating characteristics and the CSS characteristics.

Also, the present inventors measured the Abbott-Firestone curve in the radial direction of the disks processed by the disk manufacturing method according to the present invention and of those processed by the conventional disk manufacturing method, and found that the bearing ratio at the section taken at a depth of 5 nm of the disk processed by the conventional disk manufacturing method was about 10%, as shown in FIG. 54. The surface configuration of that disk varied a lot when the CSS drive was repeatedly conducted. The present inventors also found that the bearing ratio at the section taken at a depth of 5 nm of the disk of Example 3 was 50% or above, as shown in FIG. 53. Since the area of the disk with which the head was brought into contact was large, the surface configuration did not vary when the CSS drive was repeatedly conducted. The durability of the disk surface thereby greatly improved.

Figure 47:
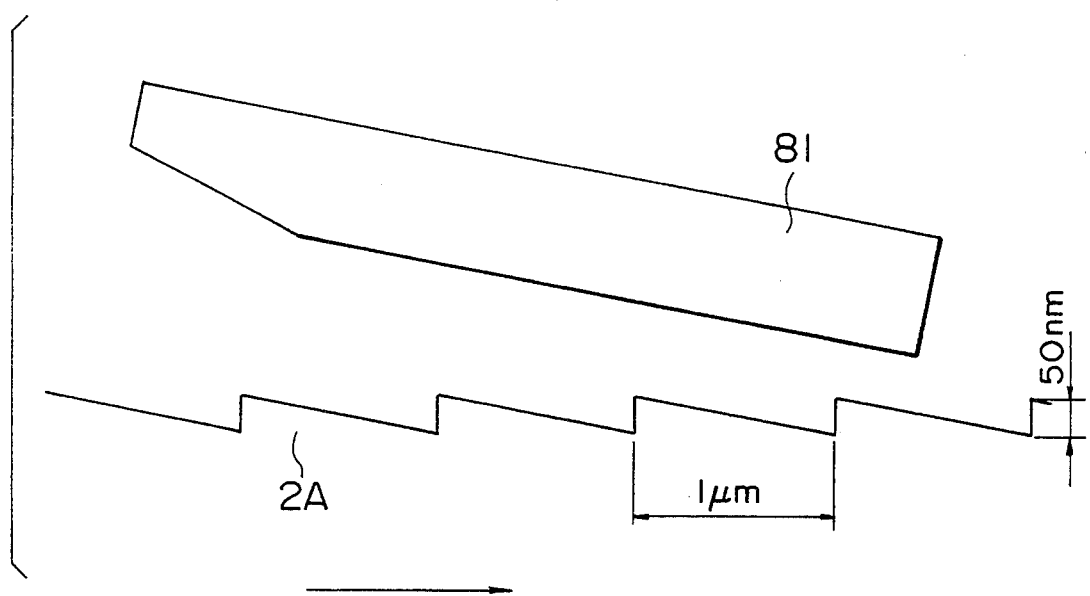
FIGS. 47 and 48 show the relation between the disk processed by the processing tools in FIGS. 45A to 46B and the magnetic head.
Figure 48:
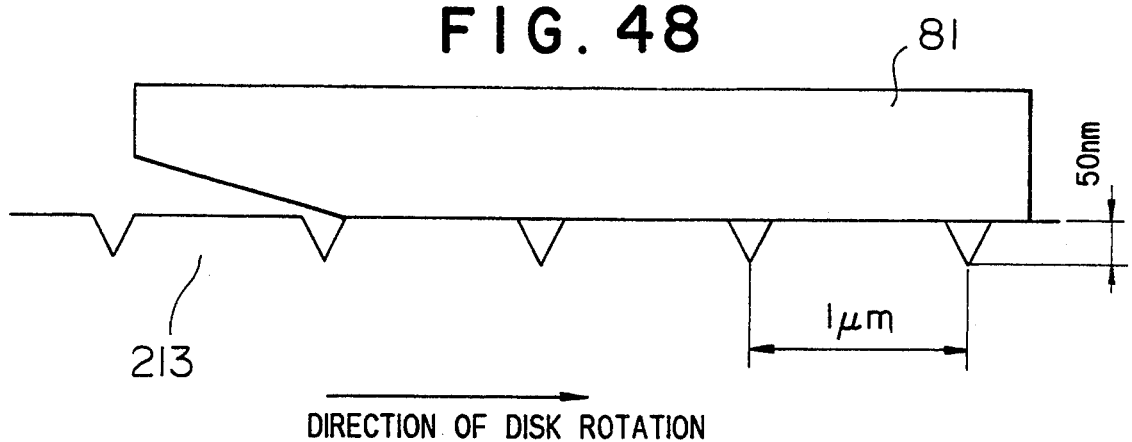

FIGS. 47 and 48 respectively show the different relations between the thin film magnetic disks 2A and 2B having different structures according to the present invention and the magnetic head 81.

The surface of the disk 2A shown in FIG. 47 has grooves which extend radially in a direction perpendicular to the direction of rotation of the disk 2A, i.e., in the radial direction thereof, and which have a saw-tooth form which is asymmetrical with respect to the direction in which the disk 2A is rotated. In consequence, a stable air flow is generated between the magnetic head 81 and the disk 2A while the head is floating in the air, generating dynamic pressure effects which accelerate floating of the magnetic head 81 at a constant height. Furthermore, vibrations of the floating head are reduced, and the output noises are thereby reduced.

The surface of the disk 2B shown in FIG. 48 has a large area with which the head makes contact, i.e., has a large bearing ratio. In consequence, changes in the form of the disk 2B caused by the contact of the magnetic head 81 are less. Furthermore, since the lubricant can be retained in the grooves provided at equal intervals, it remains on the surface of the disk 2B even after the CSS was repeatedly conducted, and increase in the CSS friction can thereby be restricted.

In the case of the disks 2A and 2B, since no burrs are generated, no fine protrusions are present. In consequence, even when the head floating height is low, the head does not make contact with the disk 2A or 2B, and no head crashing hence occurs.

The above-described examples employed the cylindrical processing tool coated with diamond. However, very hard and fine grains such as TiC grains may also be used. A processing tool whose surface with which the disk makes contact is conical or spherical may be employed in place of the cylindrical processing tool. Alternatively, a processing tool whose surface with which the disk makes contact has micro grooves and protrusions or is coated with very hard fine grains such as diamond or TiC grains may also be used. Furthermore, the above-described examples employed the aluminum disk. However, plastic working may be conducted on a non-magnetic intermediate film or a magnetic medium film coated on the surface of the substrate by the sputtering or the plating.

Figure 35:
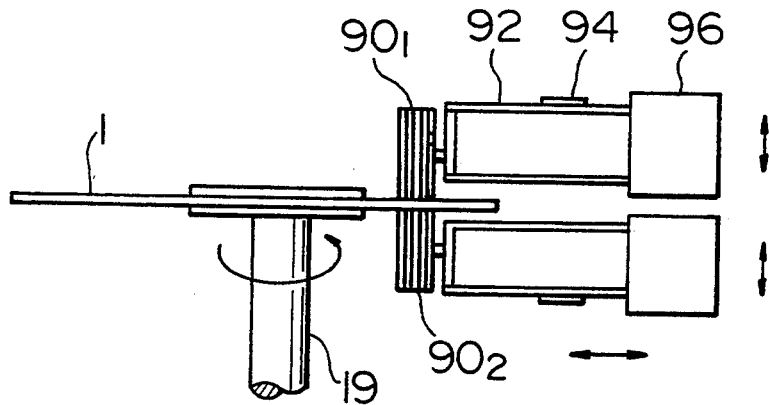
FIG. 35 is a partial plan view of the processing device of FIG. 33.

In the disk processing apparatus according to the present invention shown in FIGS. 33 and 35, the fine pressurizing force is maintained constant by employing the parallel plate spring on which the strain gage is adhered. However, the plastic working tools 90 may also be pressed against the surfaces of the disk 2 by rotatably supporting the plastic working tools 90 on a pair of rods 150 in such a manner as to be movable in the axial direction of the disk 2, as shown in FIG. 52, and by attracting the rods 150 to each other by means of a tension spring 160. The tension spring 160 may be replaced by an air cylinder whose sliding resistance is reduced as much as possible or a method of employing a magnetic force.

As will be seen from the above description, in the present invention, texture can be uniformly formed on the surface of the magnetic disk, enabling a clean and highly reliable magnetic disk surface to be formed. Furthermore, the tool has a relatively long life, and is thereby economical. The tool can easily be cleaned. Particularly, scratches or remains of the processing can be eliminated, and yield can thereby be improved.

Furthermore, since the maximum height or pitch of the texture formed on the surface of the disk can be freely set, the head floating characteristics can be improved. Furthermore, since the texture has an uniform form with no fine protrusions and a large area with which the head makes contact and, hence, a large bearing ratio, the durability of disk surface can be greatly improved. Furthermore, since the texture can be formed radially in the radial direction of the disk, which is impossible conventionally, and the dynamic pressure effects can be generated between the head and the surface of the disk, the head floating characteristics can be greatly improved.

What is claimed is:

1. A magnetic disk unit including a plurality of magnetic disks mounted coaxially and equally separated, and a head driving unit for recording data on and retrieving data from the magnetic disks by a contact start-stop driving method in which a head slider on which a magnetic head is mounted is elastically in contact with and slides against at least one surface of each of said magnetic disks under a predetermined pressure in a state where the magnetic disk is stationary and in the initial state of rotation of the magnetic disk, in which the head slider floats up because of the rotation of the magnetic disk at a high speed, and in which the head slider is moved back and forth in the radial direction of the magnetic disk, the improvement comprising a surface of said magnetic disk against which said head slider slides having a configuration which is a duplicate of a surface configuration of an irregular processed layer on a surface of a substrate of said magnetic disk which is a non-magnetic substrate, and the surface of said disk substrate having protrusions whose surfaces are made flattened, and exhibiting a three-dimensional bearing curve in which a bearing ratio at a section taken at a depth from a top portion of the surface which corresponds to a portion of the surface deformed by a head load during the contact start-stop drive is between 0.1 and 10%.

2. A magnetic disk unit according to claim 1, wherein said surface of said non-magnetic disk substrate has protrusions whose heights are substantially uniform and are between several nm and several tens of nm and whose surface is made flat, and exhibits a three-dimensional bearing curve in which a beating ratio at a section taken at a depth of 5 nm to 10 nm from the top of the protrusions is between 0.1% and 10%.

3. A magnetic disk unit according to claim 1, wherein the surface of said non-magnetic disk substrate exhibits a three-dimensional bearing curve in which the portion thereof representing the surface layer is flat.

4. A magnetic disk unit according to claim 1, wherein the surface of said non-magnetic disk substrate has at least one groove having a depth of about 100 nm within a length thereof corresponding to the width of a head slider sliding surface, and exhibits a sectional curve whose symmetry Rsk is equal to or smaller than $-0.7$ wherein.

$$Rsk = -\frac{1}{nRq^3}\left\{\sum_{i=1}^{n} Y(i)^3\right\}, Rq = \left\{\frac{1}{L}\sum_{i=1}^{n} Y(i)^2\right\}^{\frac{1}{2}}$$

where $Y(i)$ indicates a roughness curve of a surface of a magnetic disk, and $Rq$ expresses a square means roughness.

5. A magnetic disk unit according to claim 1, wherein, if the head load, W, received by the area of the surface of the disk with which the head slider makes contact, S, is expressed as W/S, and if the yield strength of the fine protrusions formed on the surface of the disk substrate is $\sigma$, the disk surface has an initial state in which the relation expressed by $\sigma \geq W/S$ holds.

6. A magnetic disk unit according to claim 1, wherein the irregularities formed on said surface processed layer comprise regular grooves and protrusions formed on a recording surface of said magnetic disk in a circumferential direction thereof.

7. A magnetic disk unit according to claim 6, wherein said regular grooves and protrusions are formed by the plastic working technique.

8. A magnetic disk unit according to claim 6, wherein said regular protrusions have polished top portions.

9. A magnetic disk unit according to claim 6, wherein each of said magnetic disks which serves as a recording media has a recording surface with a configuration which is the duplicate of a surface configuration of a substrate of said each of said magnetic disks.

* * * * *

UNITED STATES PATENT AND TRADEMARK OFFICE
CERTIFICATE OF CORRECTION

PATENT NO. : 5,353,182
DATED : October 4, 1994
INVENTOR(S) : Takao Nakamura, et al.

It is certified that error appears in the above-indentified patent and that said Letters Patent is hereby corrected as shown below:

On the title page, item [54] and column 1, line 5, change "DISK" to --DISKS--.

Claim 2, column 38, line 1, delete "beating" and substitute therefor --bearing--.

Claim 4, column 38, line 14, after "wherein" delete "." and substitute therefor --,--.

Signed and Sealed this

Fifteenth Day of November, 1994

Attest:

BRUCE LEHMAN

*Attesting Officer*  *Commissioner of Patents and Trademarks*